(12) United States Patent
Reynolds et al.

(10) Patent No.: US 9,280,227 B2
(45) Date of Patent: *Mar. 8, 2016

(54) INTERACTIVE COLOR CENTER DISPLAY APPARATUS

(71) Applicant: Behr Process Corporation, Santa Ana, CA (US)

(72) Inventors: Damien Reynolds, Huntington Beach, CA (US); Erika Woelfel, Irvine, CA (US)

(73) Assignee: BEHR PROCESS CORPORATION, Santa Ana, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/271,594

(22) Filed: May 7, 2014

(65) Prior Publication Data

US 2014/0240269 A1 Aug. 28, 2014

Related U.S. Application Data

(63) Continuation of application No. 13/932,919, filed on Jul. 1, 2013, now Pat. No. 8,752,762, which is a continuation of application No. 13/100,175, filed on May 3, 2011, now Pat. No. 8,517,267.

(60) Provisional application No. 61/330,505, filed on May 3, 2010.

(51) Int. Cl.
G06F 3/00 (2006.01)
G06F 3/041 (2006.01)
G06Q 30/02 (2012.01)
G06Q 30/06 (2012.01)
G06F 17/30 (2006.01)

(52) U.S. Cl.
CPC ............... *G06F 3/041* (2013.01); *G06F 17/30* (2013.01); *G06Q 30/02* (2013.01); *G06Q 30/06* (2013.01)

(58) Field of Classification Search
USPC .............. 235/462.01, 435, 494, 375; 345/594
See application file for complete search history.

(56) References Cited

U.S. PATENT DOCUMENTS

| 8,517,267 | B2 * | 8/2013 | Reynolds et al. | 235/385 |
|---|---|---|---|---|
| 8,752,762 | B2 * | 6/2014 | Woelfel et al. | 235/439 |
| 2005/0140691 | A1 * | 6/2005 | Rice | 345/593 |
| 2006/0001677 | A1 * | 1/2006 | Webb et al. | 345/594 |
| 2009/0276091 | A1 * | 11/2009 | Duha et al. | 700/239 |

* cited by examiner

Primary Examiner — Christle I Marshall
(74) Attorney, Agent, or Firm — Lapple Ubell IP Law, LLP; Franklin Ubell

(57) ABSTRACT

A display unit comprising a plurality of display modules arranged in a row and having an upper display section and a lower display section. One of the display modules includes an interactive Kiosk, and a second of the display modules includes at least one computer controlled card reading video station. A consumer may pass a coded paint color sample card past a code reader in the video station and is thereafter presented with a display of a color present on the sample card followed by a selectable sequence of video display screens, which may comprise part of a color selection application program.

23 Claims, 52 Drawing Sheets

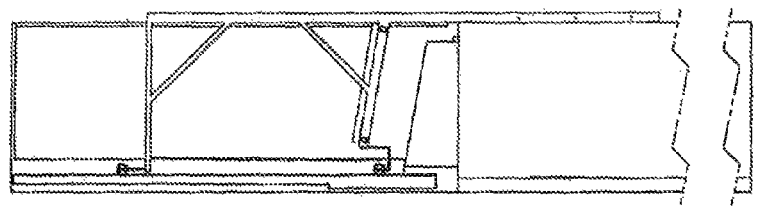
FIG. 21
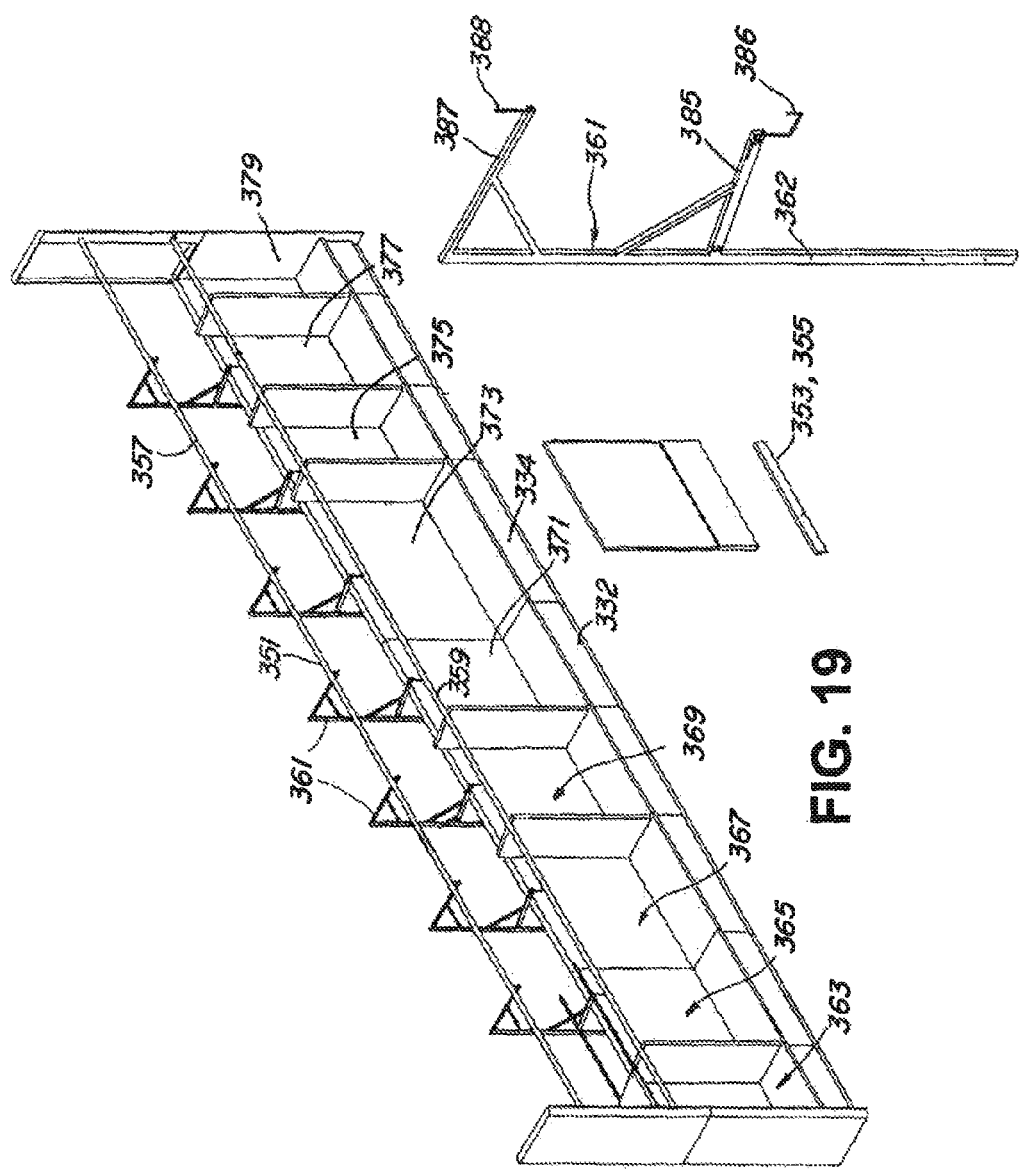
FIG. 20
FIG. 19

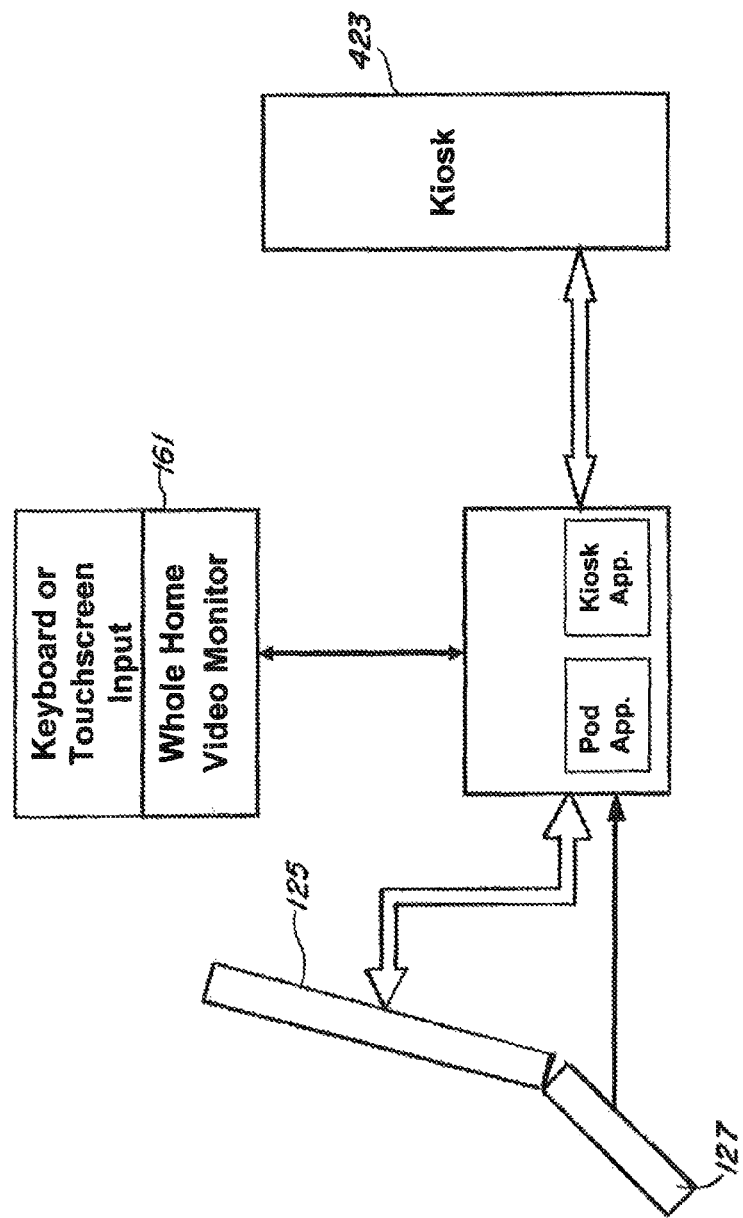

FIG. 58

INTERACTIVE COLOR CENTER DISPLAY APPARATUS

CROSS REFERENCE TO RELATED APPLICATIONS

This application is a continuation of and claims priority to U.S. Utility patent application Ser. No. 13/932,919, entitled "Interactive Color Center Display Apparatus," filed on Jul. 1, 2013, which is a continuation of and claims priority to U.S. Utility patent application Ser. No. 13/100,175, with the same title, filed on May 3, 2011, which claims priority to U.S. Provisional Patent Application Ser. No. 61/330,505, filed on May 3, 2010, also with the same title, the contents of which are incorporated herein by reference in their entireties.

BACKGROUND

Field

The subject disclosure relates to display systems and in one embodiment, to a large merchandising display for presenting, advertising and promoting paint and other coating products in a retail environment and providing product information to consumers and others.

SUMMARY

An illustrative display unit embodiment includes a plurality of display modules arranged in a single row and having an upper display section and a lower display section. One of the display modules may comprise an interactive Kiosk comprising a touch sensitive interactive display screen permitting a user to selectively access a variety of color selection and/or transmission features.

A second of the display modules may include at least one card reading video station wherein a consumer may pass a coded paint color sample card past a code reader. The consumer is thereafter presented with a display of a color present on the sample card followed by a selectable sequence of video display screens, which may comprise part of a color selection application program.

A third of the display modules may comprise a whole home display including a computer controlled video monitor allowing a consumer to visually walk through a home and illustrating how colors for the rooms of the home may be coordinated.

DRAWINGS

FIG. 19 is a perspective view illustrating the structure of the display of FIG. 16;

FIG. 20 is a perspective view of a support component of the structure of FIG. 18;

FIG. 21 is a side view of the support component of the structure of FIG. 18;

FIG. 28 is a system block diagram of interactive components of the display;

FIG. 53-58 illustrate display screens which comprise an interactive product quiz;

DETAILED DESCRIPTION

Figure 1:
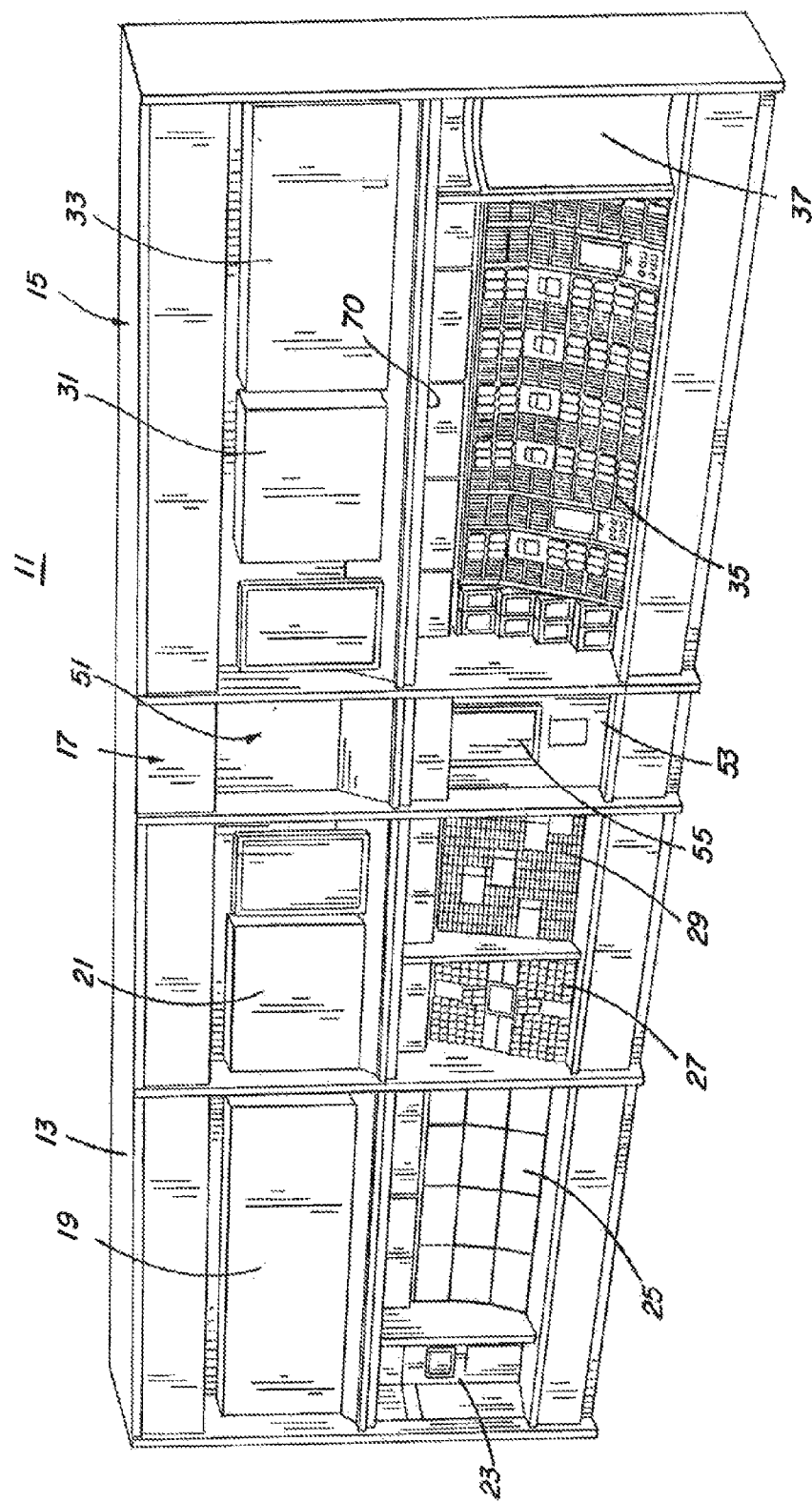
FIG. 1 is a perspective view of a first interactive color center display embodiment.

A double wall display 11 is shown in FIG. 1. The display 11 includes a first rectangular wall section 13 and a second rectangular wall section 15. Between the wall sections 13, 15 is positioned a Kiosk section 17. The Kiosk section 17 includes an upper section 51, and a lower section 53. The lower section 53 includes an interactive display screen 55

The first wall section 13 includes two generally rectangular upper display panels 19, 21 and four lower displays 23, 25, 27, 29, which comprise, respectively, a wood stain center (EWCC) 23, an "S1" center 25, a "whole home" center 27 and a "premium plus ultra" paint information ("PPUI") center 29.

The second wall section 15 includes two upper generally rectangular display areas 31, 33 and two lower displays 35, 37. The lower displays 35, 37 comprise a core paint color center display 35 and a third party display 37, which may be, for example, a display of third party color chips, such as Disney. Above each of the lower display sections 23, 25, 27, 29, 35, 37 is positioned a generally rectangular light box e.g. 70, arranged to illuminate the displays which lie beneath them.

Figure 3:
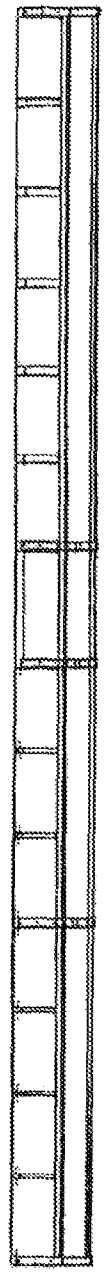
FIG. 3 is a top view of the structure of the display of FIG. 1.
Figure 2:
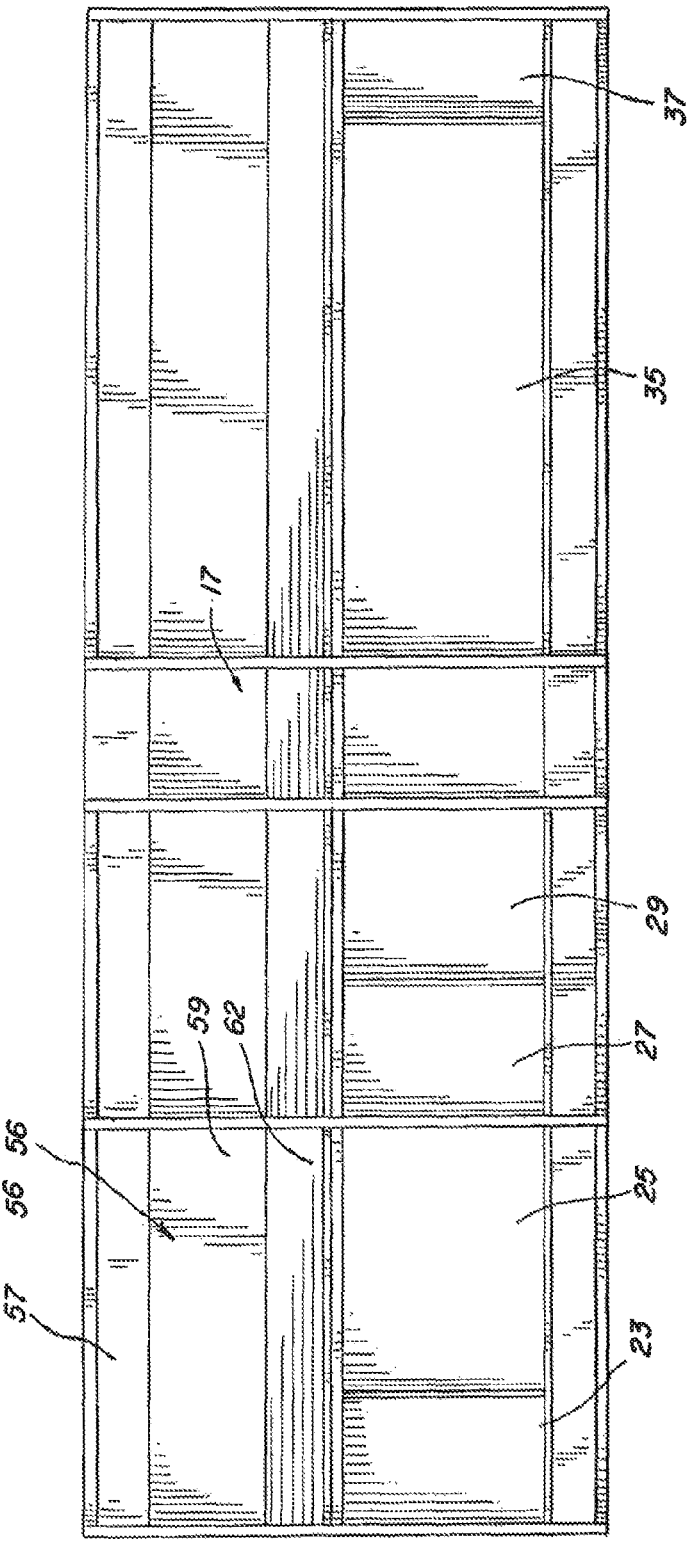
FIG. 2 is a front view illustrating the structure of the display of FIG. 1.
Figure 4:
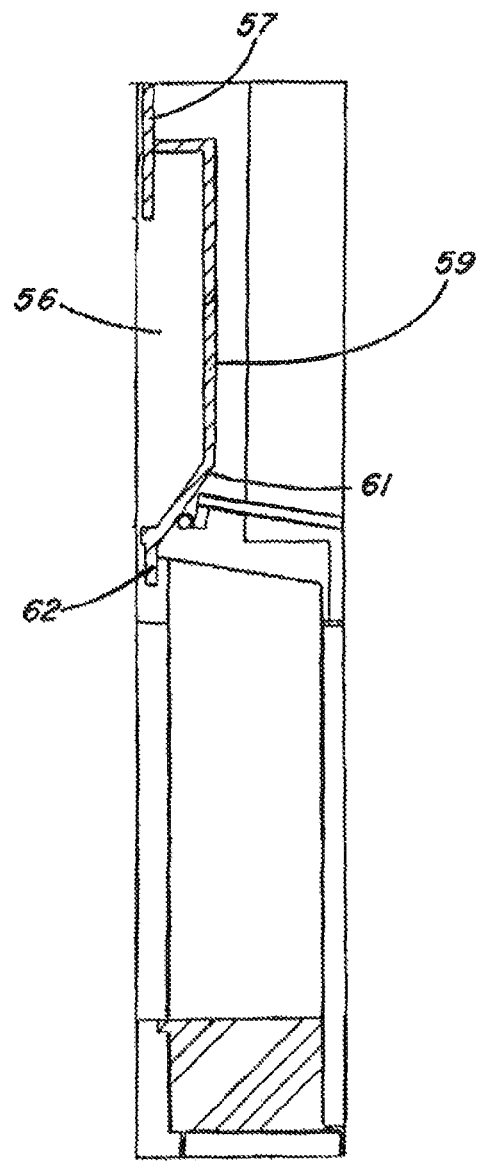
FIG. 4 is a side sectional view of the frame structure of the display of FIG. 1.

FIGS. 2-4 illustrate the display structure in further detail. As shown, the upper rectangular displays, e.g. 19, may supported by a structure 56 comprising a vertical header 57, which may display suitable graphics, as well as a recessed back panel 59, with an angled end portion 61 leading into a vertical footer 62.

Figure 5:
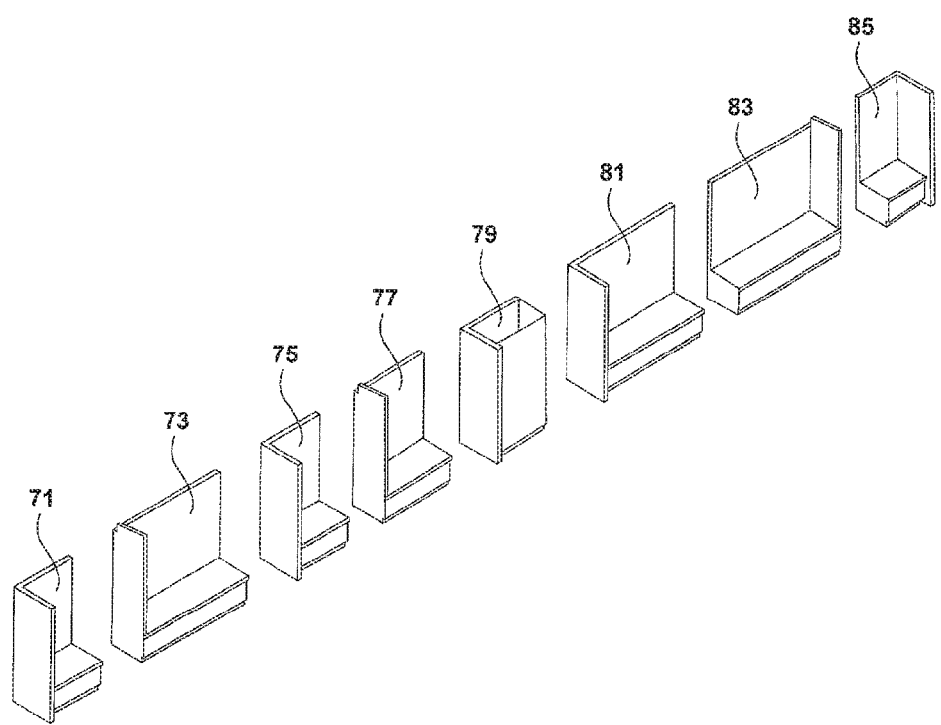
FIG. 5 is a perspective view of cabinet components of the display of FIG. 1.

In the illustrated embodiment, the upper displays are attached to and supported by horizontal tubing 63, 65, (FIG. 6) which attach to upper frame panels 67, which in turn are attached to lower cabinet sidewalls. The lower cabinets are illustrated in further detail in FIG. 5 and, in the illustrative embodiment, comprise an EWCC lower body 71, an S-1 lower body 73, a whole home lower body 75, a PPUI lower body 77, a Kiosk lower body 79, right and left core lower body sections 81, 83 and a third party display lower body 85. The respective displays identified in connection with FIG. 1 are mounted in their respective cabinet sections of FIG. 5.

Figure 6:
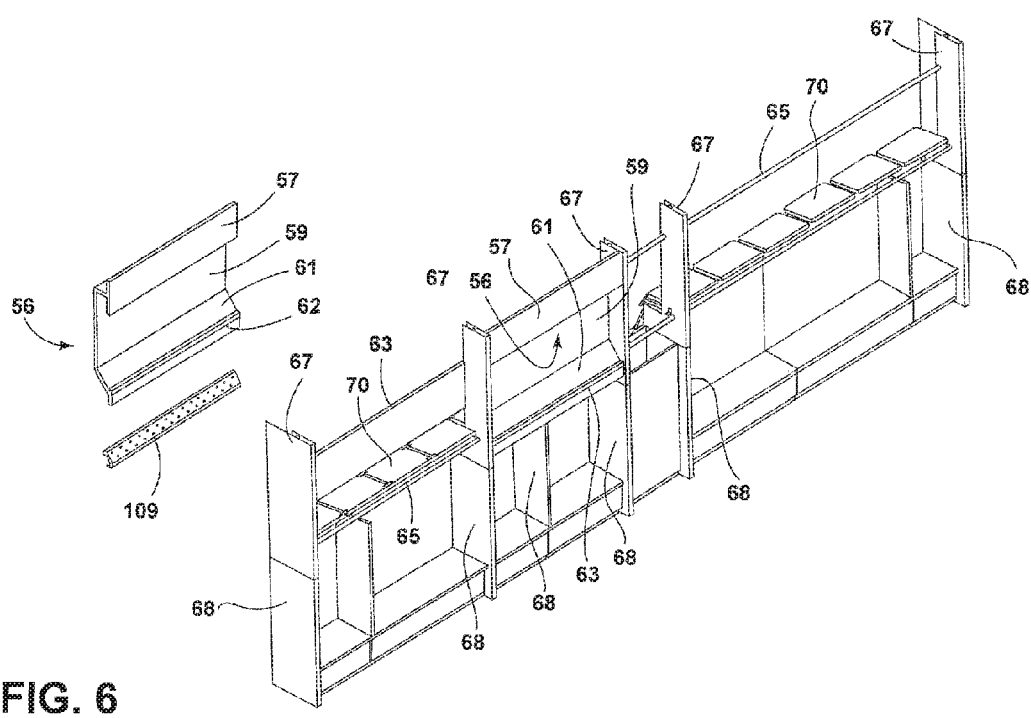
FIG. 6 is a perspective view of a partially assembled frame structure of the embodiment of FIG. 1.

FIG. 6 illustrates an embodiment for supporting the upper signage frames. The structure of FIG. 6 includes upper frame sidewalls 67 attached to respective lower cabinet side walls 68, as well as the horizontally extending tubing, e.g., 63, 65, mounted or attached to the upper sidewalls 67 and various light boxes, e.g. 70. One of the upper display support structures 56 is shown attached to the tubing 63, 65 in finished position in FIG. 6. Steel angles 109 may be used to attach the lower end 62 of signage display 21 to a lower horizontal tube, e.g., 65.

FIGS. 7-13 illustrate one embodiment of a core color center display 35. The core display 35 includes a number of display sections 111, 112 etc. positioned within cabinets 81, 83 and resting on first and second bases 121, 123.

Figure 8:
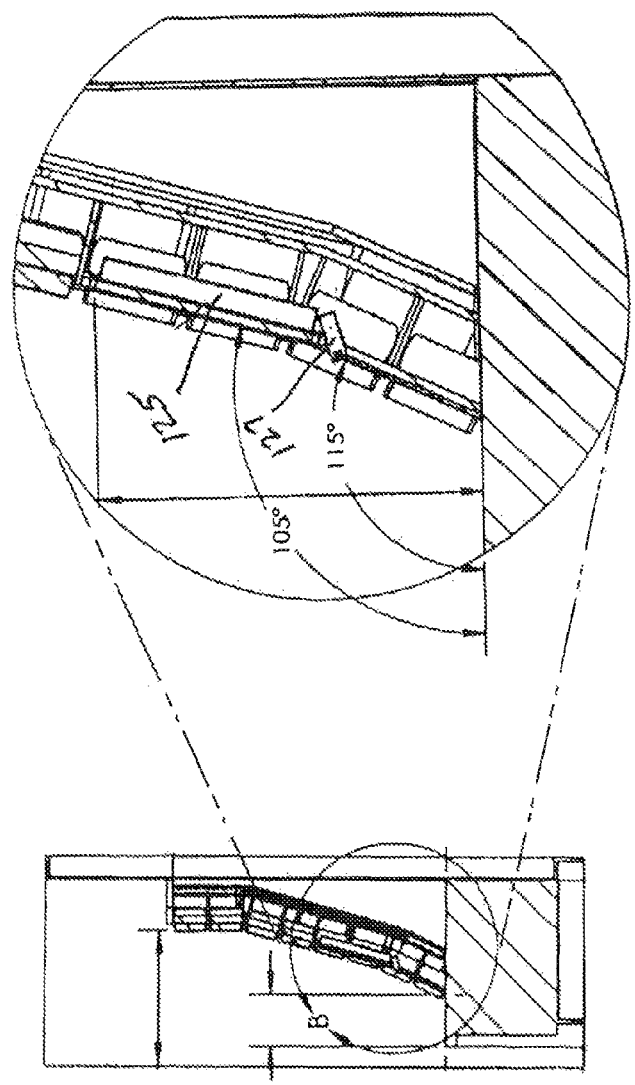
FIG. 8 is a side view illustrating a scanner and video monitor assembly of the core color center of FIG. 7.
Figure 9:
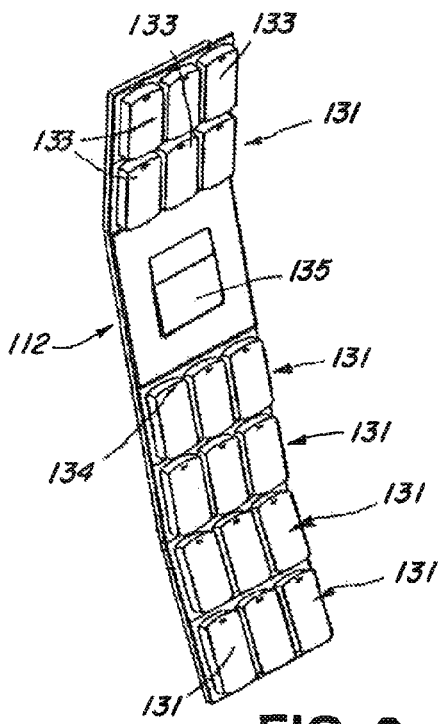
FIG. 9 is a perspective view of a combo card section of the core color center of FIG. 7.
Figure 11:
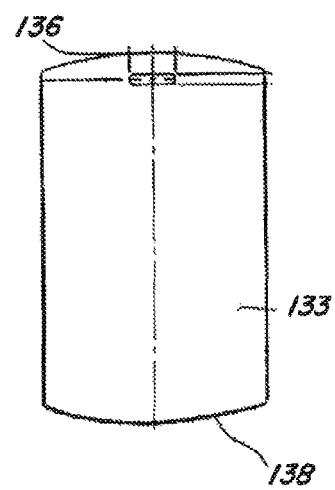
FIG. 11 is a front view of a color combo card.
Figure 10:
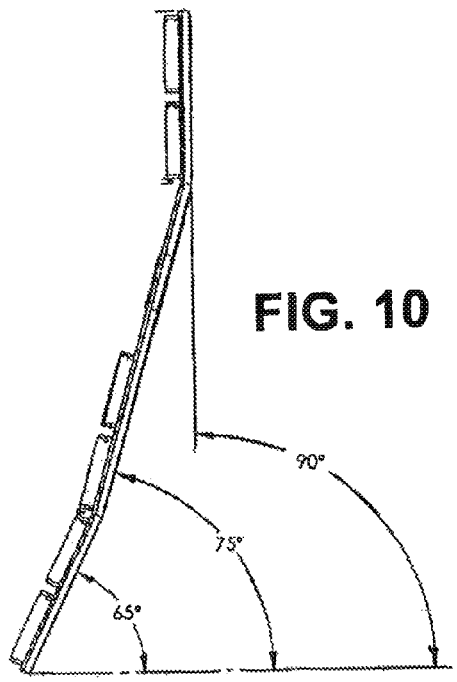
FIG. 10 is a side view of a combo card section of the core color center of the FIG. 7.

One embodiment of a display section 111 is illustrated further in FIG. 8 and includes a computer controlled video monitor 125 and a cooperating card reader or scanner 127, as well as four rows of color cards 128 and six sheen samples 130. On one side of each display section 111 is located a second display section 112, illustrated in further detail in FIGS. 9-10. Each display section 112 includes a number of rows 131, each having 3 color cards 133, each card 133 suspended by a peg hook 134 mounted in a back portion of the display section 112. Below the first two rows 131 of color cards 133 is positioned a literature holder or pouch 135. Each card 133 has respective rounded or oval top and bottom surface 136, 138.

Figure 13:
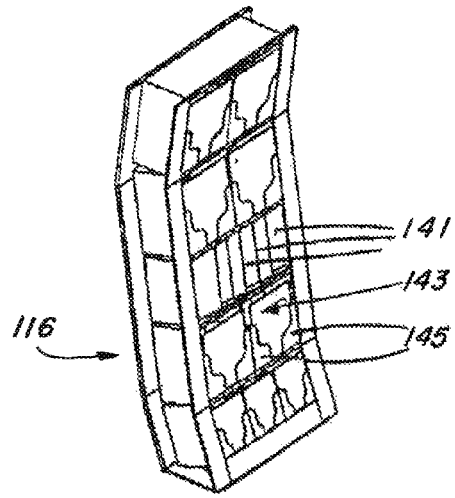
FIG. 13 is a perspective view of a brochure section of the core color center of FIG. 7.
Figure 12:
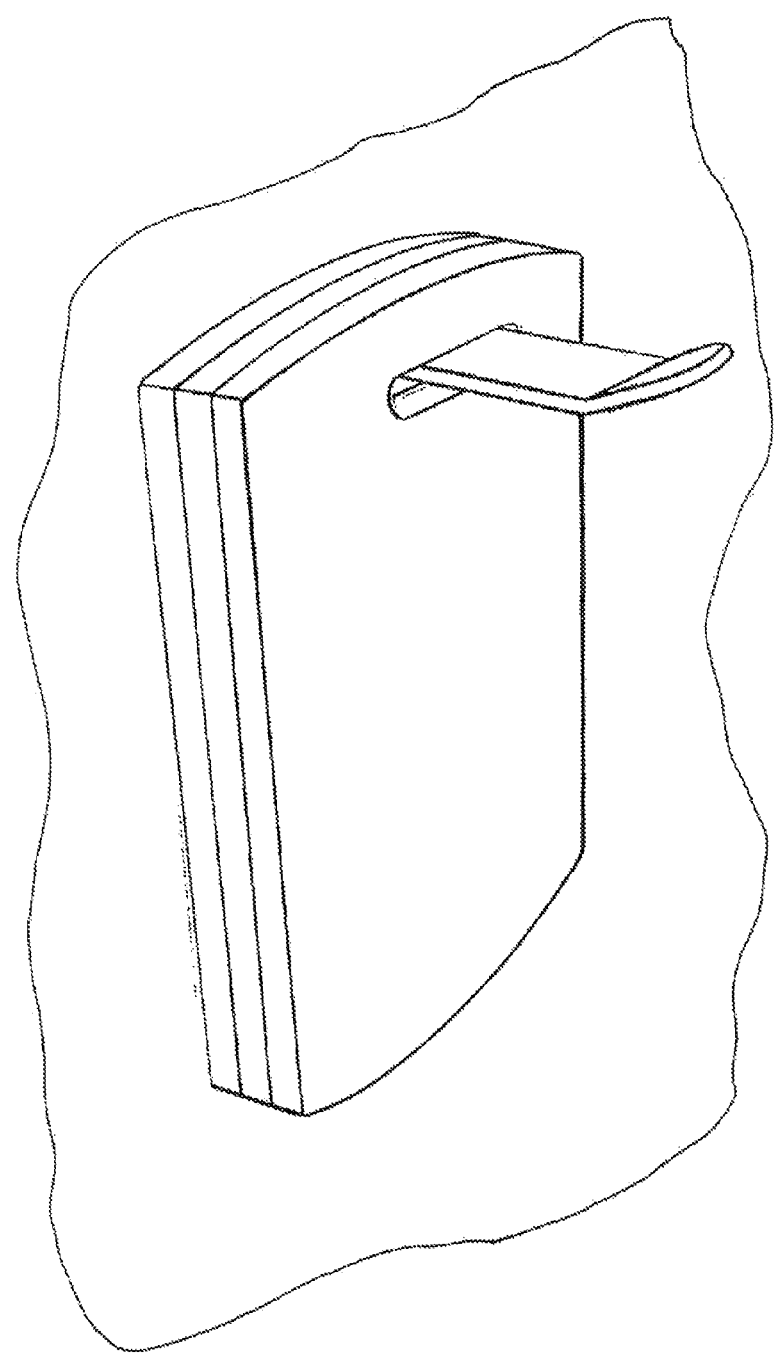
FIG. 12 is a perspective of a color combo card and peg on which it hangs.

The core display 35 further includes a number of side load paint display card sections 114 and a brochure section 116, shown in further detail in FIG. 13. Overlapping side load pockets 141 are positioned in a center row of the illustrative brochure section, while the remaining four rows include top loading pocket 143, with respective juxtaposed side front retaining panels 145.

Figure 15:
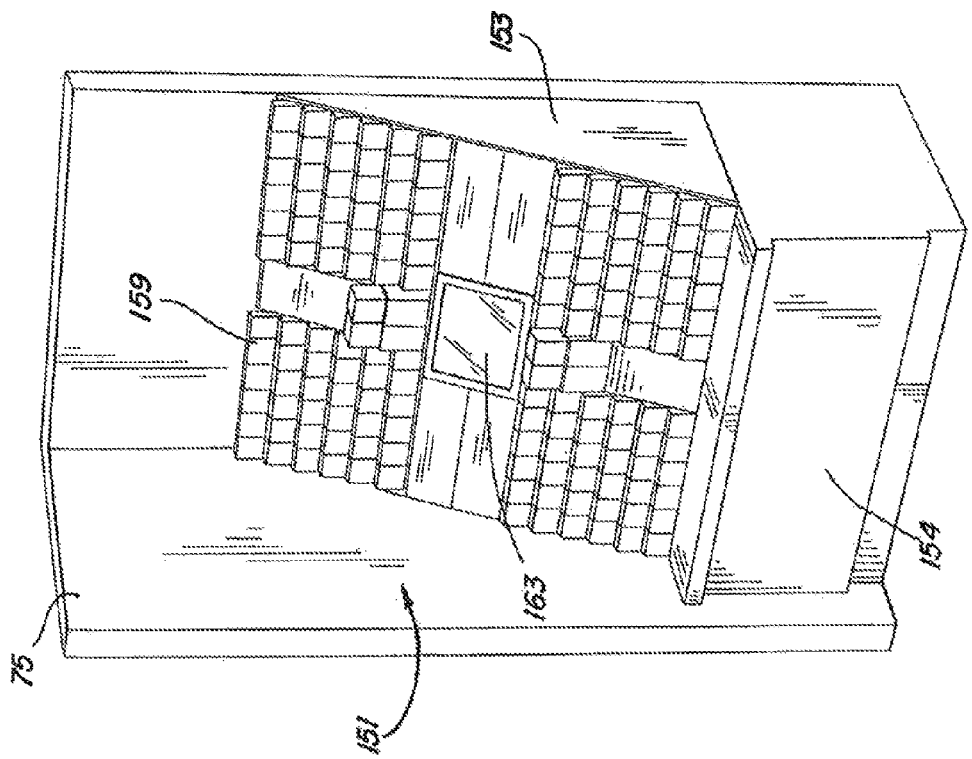
FIG. 15 is a perspective view of a "whole home section" of the display of FIG. 1.
Figure 14:
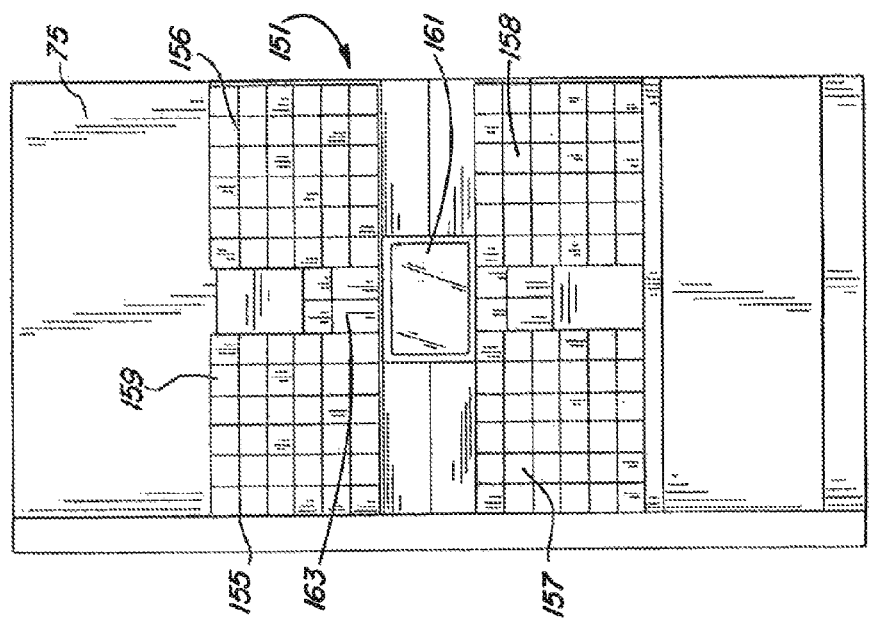
FIG. 14 is a front view of a "whole home section" of the display of FIG. 1.

An illustrative whole home section 151 is shown in FIGS. 14 and 15. The whole home section 151 includes an acutely angled card receptacle 153 resting on a base 154 positioned within the cabinet 75. The whole home section 151 includes four rectangular arrays 155, 156, 157, 158 of color card receptacles, e.g. 159, disposed to vertically position respective color cards. Each rectangular array 155, 156, 157, 158 may be devoted to color cards matching a particular theme such as contemporary, modern, eclectic and casual. A computer controlled display monitor 161 is centrally positioned in the display 151, adjacent the lower inner corners of the upper card receptacle arrays 155, 156 and the upper corners of lower card receptacle arrays 157, 158. Collateral material holders 163 may also be positioned above and below the central monitor 161.

In an illustrative embodiment, the monitor 161 is arranged to show a video or a series of screen shots which walks a consumer through a whole home illustrating to the consumer how colors for the rooms of the entire home may be coordinated. In one embodiment, the display screen may be touch sensitive such that a consumer can scroll through or otherwise select subsequent screen shots or video segments.

Figure 16:
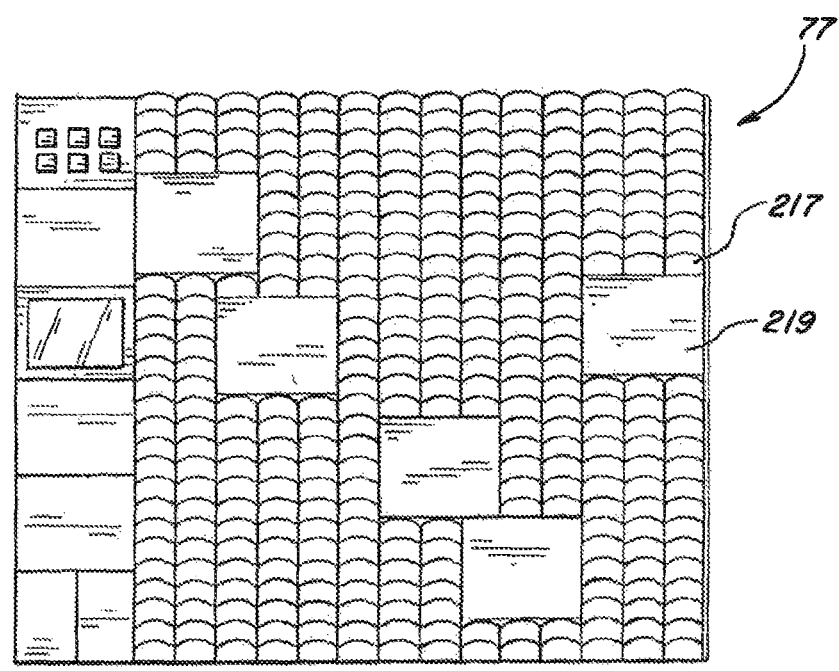
FIG. 16 is a front view of a "PPUI" section of FIG. 1.

A PPUI display 77 is illustrated in FIG. 16 and includes a rectangular array comprising a number of color cards, e.g. 217, and five flower petal covered brochures, e.g. 219, disposed at selected positions within the display 77.

Figure 17:
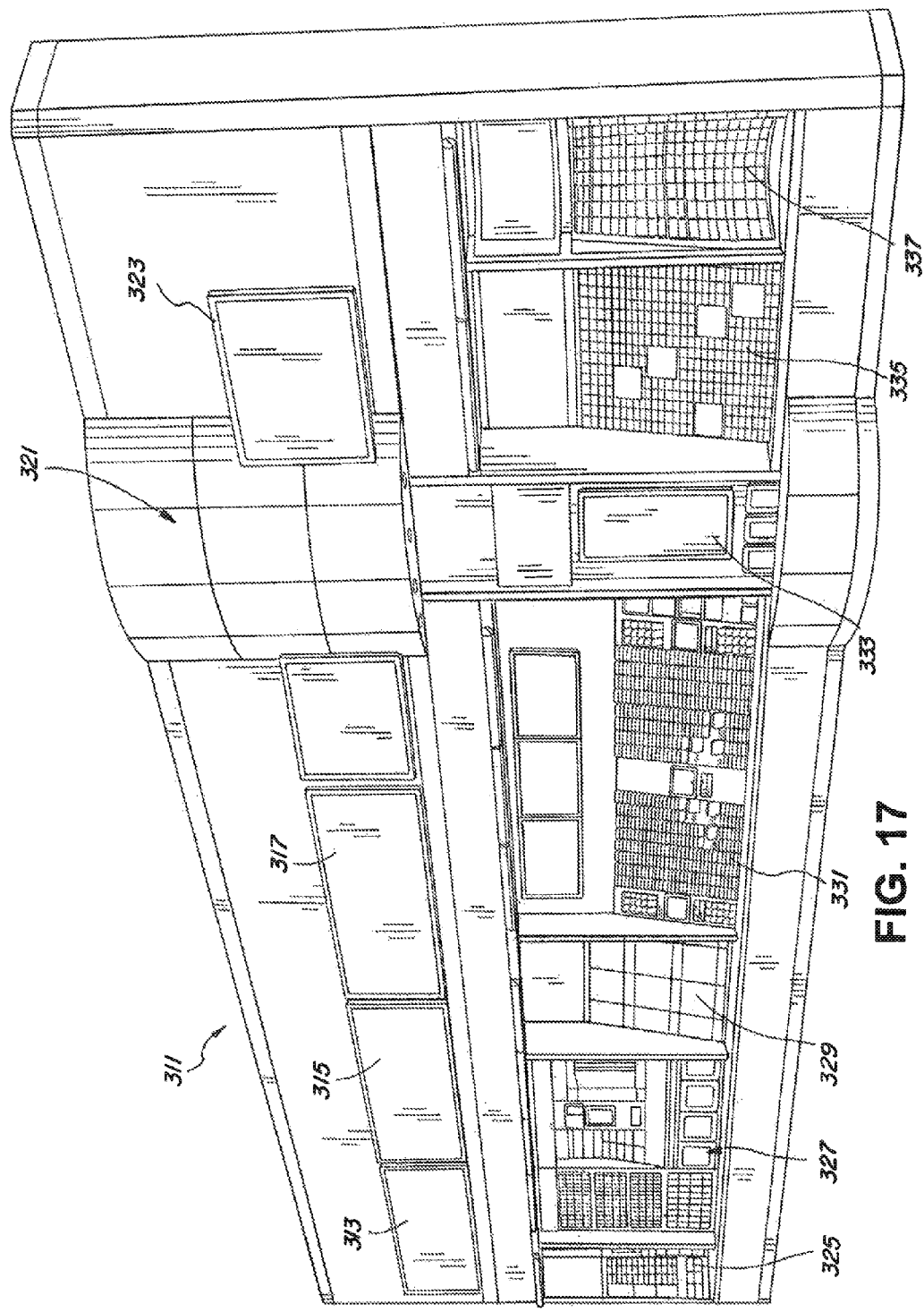
FIG. 17 is a front perspective view of a second color center display embodiment.
Figure 18:
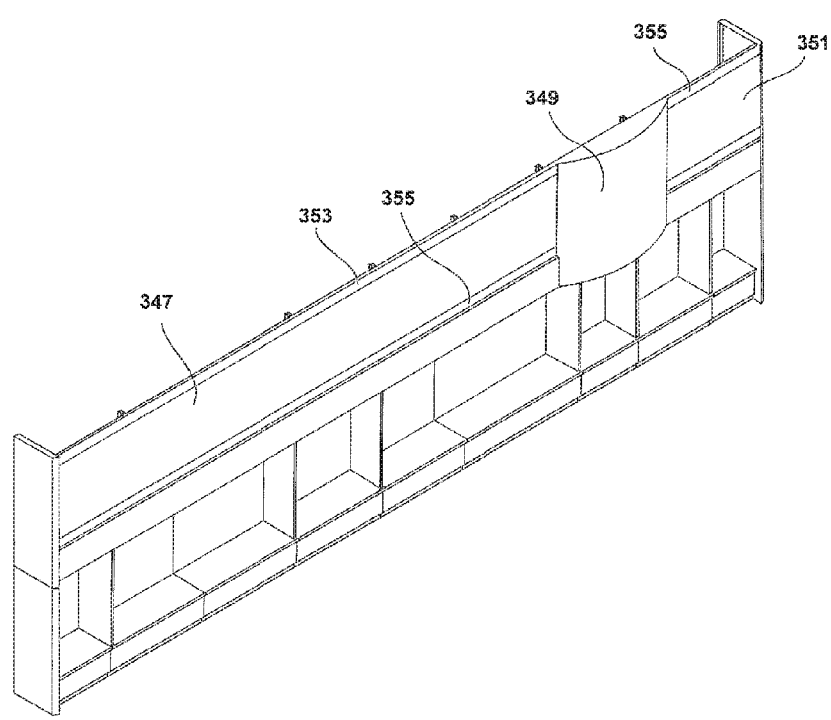
FIG. 18 is a perspective view illustrating the structure of the display of FIG. 16.

Another color center display embodiment 311 is shown in FIG. 17, which may be referred to as a single wall embodiment. The embodiment of FIG. 17 includes a plurality of upper display areas 313, 315, 317, 319, 321, 323 and a plurality of lower display sections 325, 327, 329, 331, 333, 335, 337. The lower sections comprise a wood stain center ("EWCC") display 325, a third party display 319, a core color center display 331, a color Kiosk 333, a premium plus paint and primer (PPUI) display 335 and a third party display (Disney) 327.

In the illustrative embodiment of FIG. 17, the upper display section 313, 315, 317, 319 comprise four rectangular framed graphic presentations, which may, for example, be themed to attract customer attention to attractively painted rooms. Such graphics may be, for example, Duratron LED back lit graphics, static graphics or other types in an illustrative embodiment.

FIGS. 18-21 show a structure or assembly for receiving and/or supporting the various displays and graphics illustrated in FIG. 17. This structure includes an elongated rectangular upper mounting surface 347, a crown section 349 and an end section 351. Steel rail sections 353, 355, are employed to hook or otherwise attach the rectangular upper section 347 to respective upper and lower tubes 357, 359 (FIG. 19). The tubes 357, 359 are supported and positioned by a number of standards, e.g., 361 attached to the rear walls of lower cabinets 363 . . . 379. As shown in FIG. 19, a standard 361 includes a vertical member 362 from which extends a lower horizontal support member 385, carrying a hook 386 at its end, and an upper support member 387 angled slightly downwardly to the horizontal and having an upper projecting pin 388 at its far end. The lower cabinets 363 . . . 379 provide surfaces which receive and mount the respective lower displays 325 . . . 337 of FIG. 17.

Figure 22:
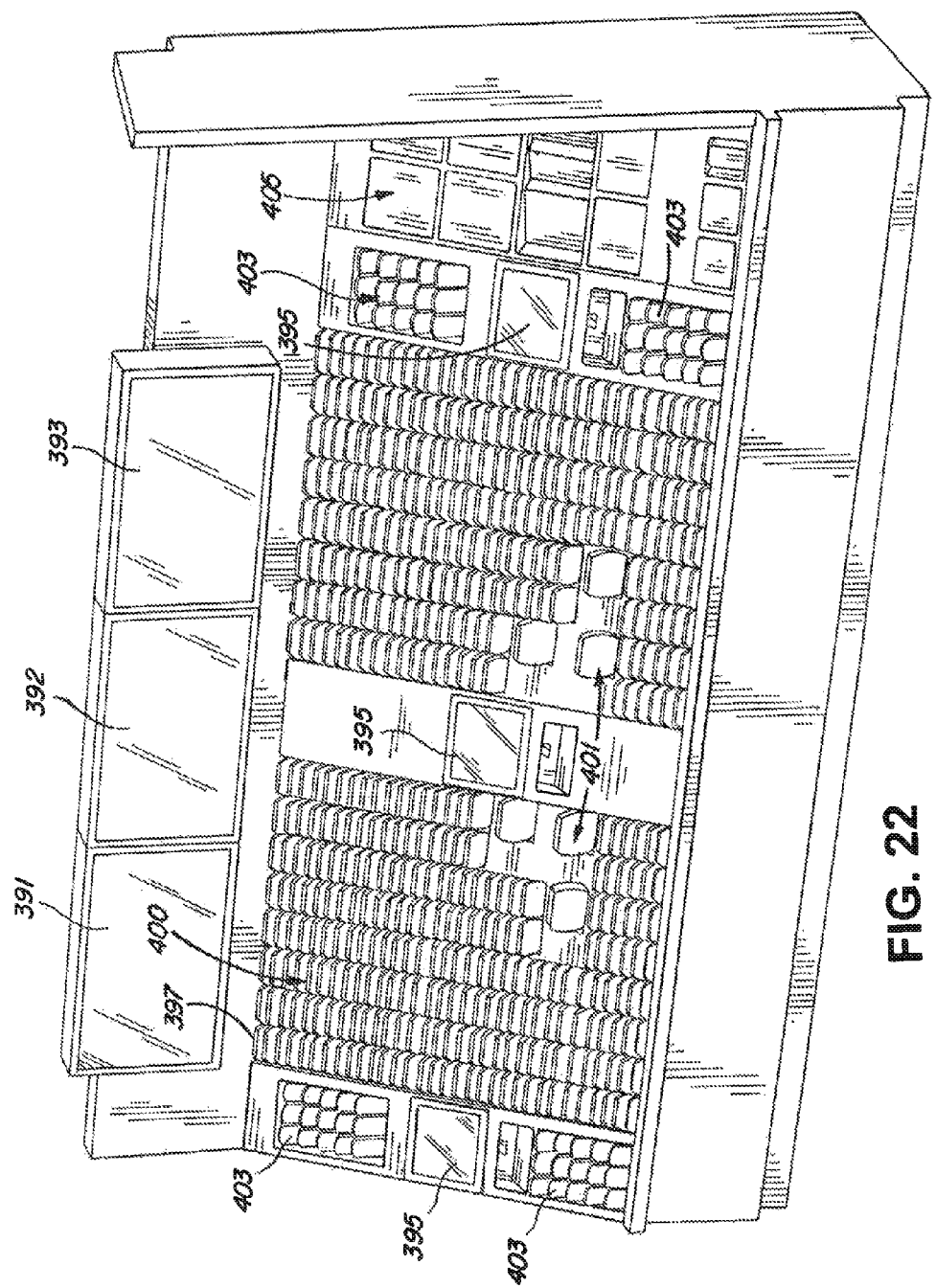
FIG. 22 is a perspective of the core color center display of the embodiment of FIG. 16.
Figure 23:
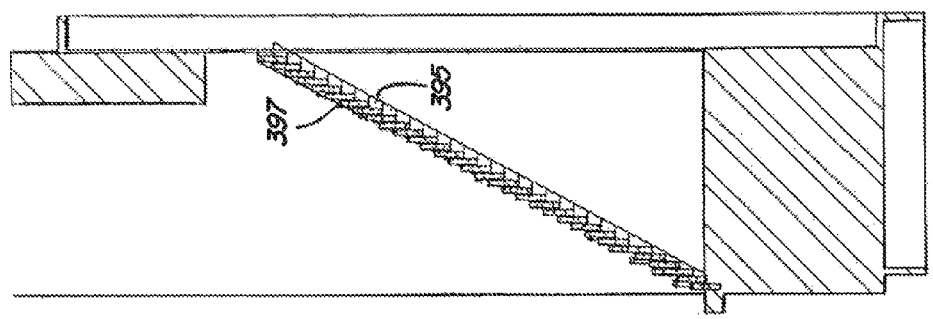
FIG. 23 is a side sectional view of the display of FIG. 21.
Figure 24:
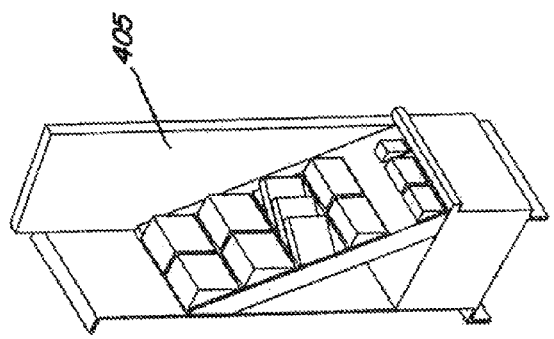
FIG. 24 is a perspective view of a brochure section of the display of FIG. 21.

An illustrative embodiment of a core color center display 331 mounted on base decks 332, 334 is shown in FIGS. 22-24. The core display 331 of FIGS. 22-24 includes 3 flat screen television monitors 391, 392, 393, which may comprise, for example, LCD, Plasma, or LED flat screens. The display 331 further includes three scanner/monitors 395, which may be constructed and function the same as the monitors 125 of FIG. 7. As shown in FIG. 23, the core color center 331 includes a large number of color cards, e.g. 397, disposed vertically in respective mounting slots, e.g. 398 in a main color card section 400. A number of collateral brochures 401 are located near the central monitor 395.

Color cards 403 of a different format are located in four rectangular display areas at opposite ends of the main color card section 400. A brochure section 405 is located at the right end of the core center display 331, and is shown in more detail in FIG. 24.

Figure 25:
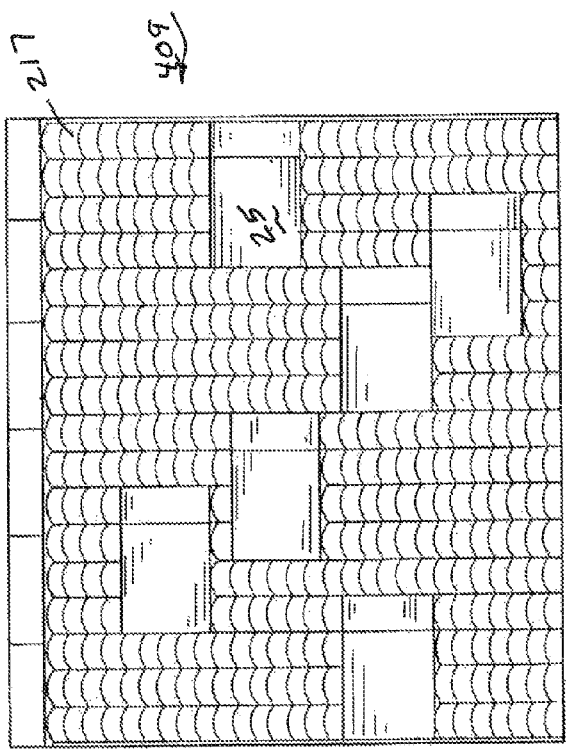
FIG. 25 is a front view of an illustrative PPUI embodiment.

An illustrative embodiment of a PPUI 409 is shown in FIG. 25. This embodiment includes a rectangular array comprising number of color cards, e.g. 217, and six flower petal covered brochures, e.g. 219, disposed at selected positions within the display 77.

Figure 26:
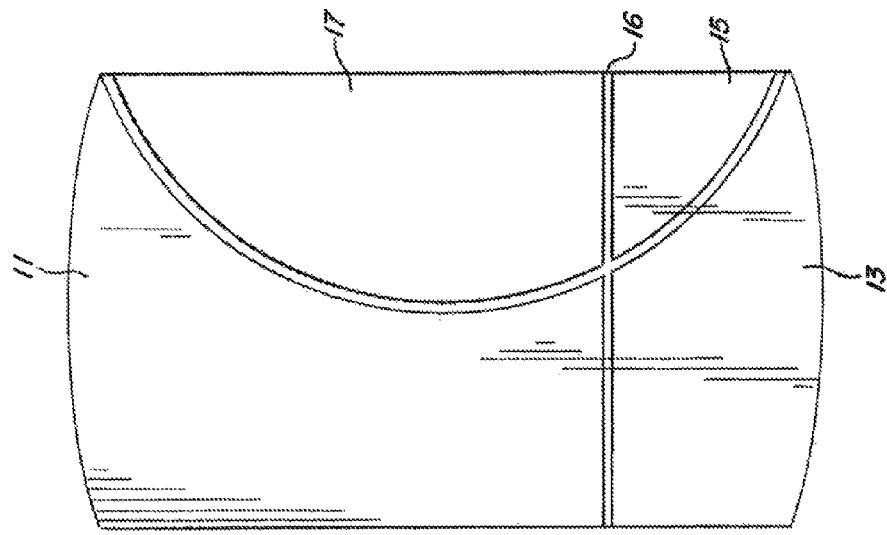
FIG. 26 is a front view of a color combo card.

A color combo card which may serve, for example, as cards 403 is shown in FIG. 26. It includes three different colors: a main or body color 11, a trim color 13, and accent color 15, as well as an inspirational graphic 17. A horizontal dividing line 16 separates the body color 11 and graphic 17 from the trim and accent colors 13, 15. A circular dividing line 18 separates the graphic 7 from the body 18 and the trim color 15. The three color shades on the card may be selected to be harmonizing colors that work together in a decorating scheme inspired by the photo or graphic 17. The graphic 17 may be either photo from nature; a deco-related photo using furniture or textiles or room scenes; or a lifestyle photo of people, place, animals activities from life. The card further has slightly arcuate bottom and top edges and straight side edges. Such cards may be fabricated of various material, such as for example, sturdy paper stock.

Figure 27:
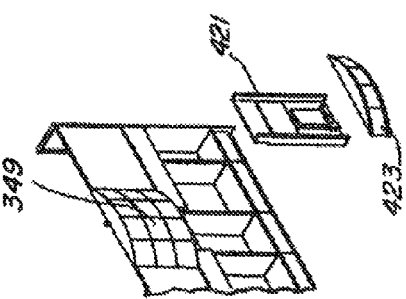
FIG. 27 is a perspective view of an illustrative main Kiosk embodiment.

FIG. 27 shows details of the Kiosk display section 333 including a front plate 421 with video display screen and a lower panel section 423 of arcuate contour preferably matching the contour of the upper contoured section 349 of the Kiosk section 333. The modular structure of the single and double wall display embodiments allow the Kiosk unit and other units to be positioned at other locations in the display, The scanners 127 are adapted to read a bar code on a color card whereafter the computer monitor electronics controlled by a computer and program storage media 128 (FIG. 28) may cause entry into a color selection and coordination computer program application where the application may begin by causing video display of the color displayed on the physical color card which was scanned. The application may thereafter enable performance of various color selection features, embodiments of which are disclosed, for example, in U.S. patent application Ser. Nos. 12/610,192; 12/610,031; 12/128,582, 11/041,659, and 12/381,269 all incorporated by reference in their entirety herein.

Figure 7:
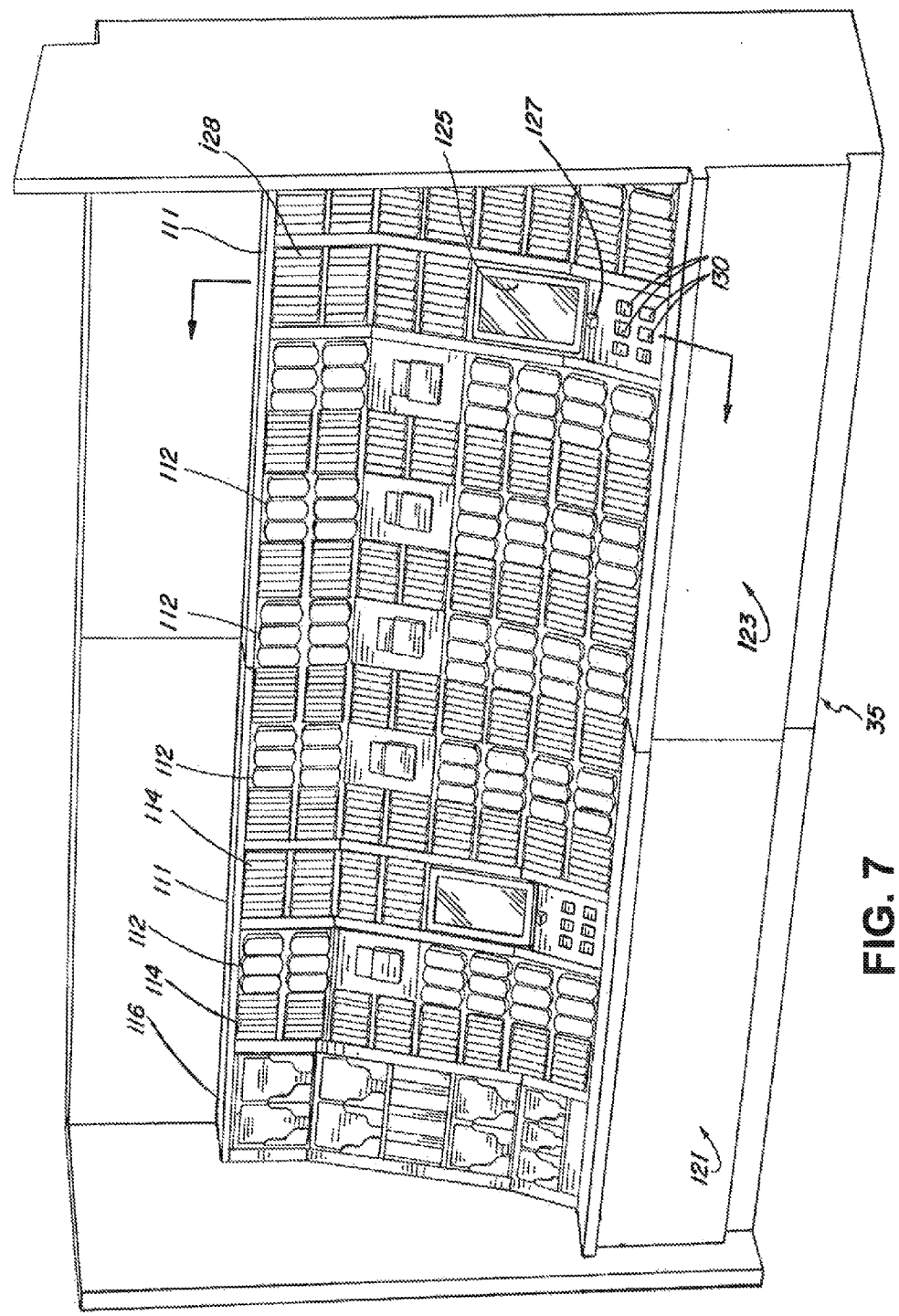
FIG. 7 is a perspective view of a core color center portion of the embodiment of FIG. 1.

In one embodiment, two embedded stations or "pods", each including a color scanner, e.g. 127, and two 15 inch touch screen monitors are provided in a manner similar to monitors 125 of FIG. 7. Above these monitors is positioned a digital signage screen, which may comprise three 40 inch LCD monitors positioned, for example, as in FIG. 21. This screen plays or displays an inspirational digital video "attract" loop above the core palette to draw attention of consumers and others to the palette display. In one embodiment, motion detectors may be positioned to sense where the consumer is in respect to the display and display colors on the monitors which are on cards adjacent to the consumer's location. The main Kiosk, e.g. 53, may comprise a 32 inch touch capacitive screen 423, which is controlled by Kiosk display computer program application and displays various color selection related displays and allows emailing and texting as hereafter described.

In another embodiment, separate computers and their associated memory including program storage media may be employed to control each display screen/monitor 125, 161, 423. In one embodiment, only a "pod" screen 125 and scanner 127 are employed with a computer interfacing with the monitor 125 and scanner 127 and with the computer running a pod application program stored on associated computer readable storage media and configured to execute functionality and control display of various display screens, for example, as described in connection with FIGS. 29-40 hereof. Such a computer and the computer(s) of other embodiments may be configured to communicate wirelessly with the Internet and/or other communication media, such as, for example, cell and smart phones. A computer may comprise one or more computers, microcontrollers, microprocessors, general or special purpose computers including but not limited to, a computer dedicated to executing pod related color selection and other functions as described herein.

In an illustrative embodiment, the web pages or display screens presented by a "POD" computer program application on the "pods" 125, 127 may include those shown and described in FIGS. 29-40. The display screens or web pages on the main Kiosk display may include those shown and described in FIGS. 41-63.

Figure 30:
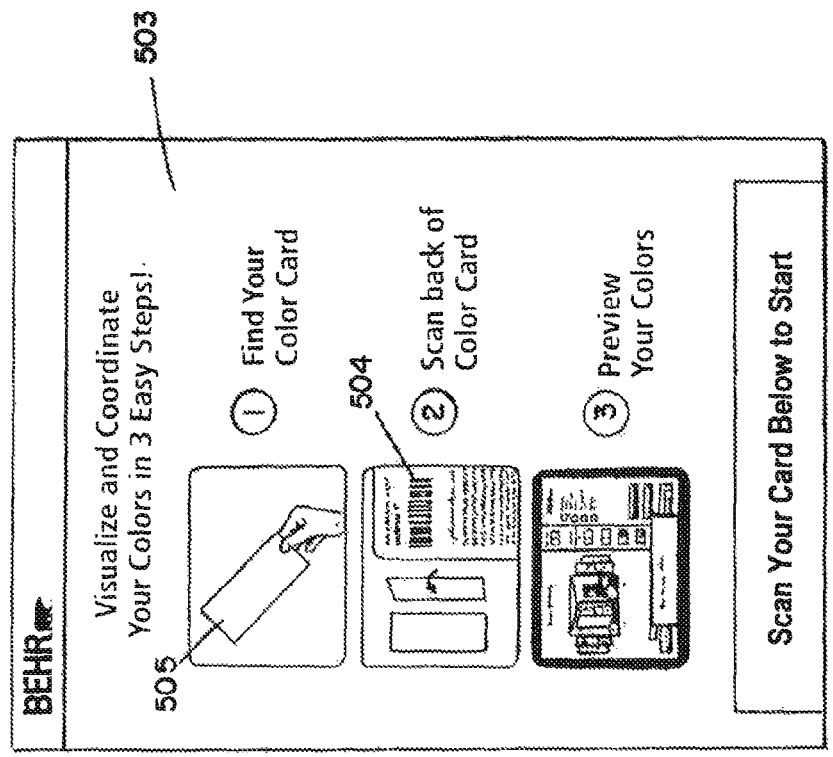
FIG. 30 illustrates an instructional display screen of the POD application.
Figure 29:
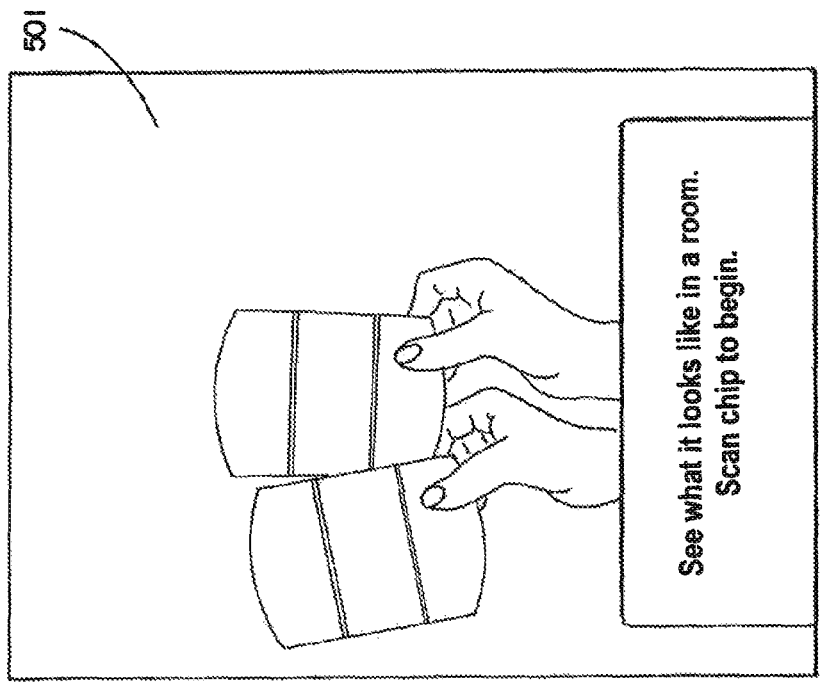
FIG. 29 illustrates an initial attract loop display screen of an illustrative color center monitor ("POD") interactive application.

FIG. 29 illustrates a display screen 501 comprising an initial attract loop screen, which comprises part of an instructional attract loop for a customer to follow to use the interactive "POD" application. FIG. 30 illustrates an instructional page 503 for the customer to follow to use the interactive application. This screen 503 appears after the attract loop screen 501 is touched. This screen 503 instructs the customer/user to find a color card 505 in the display module or core color center, e.g. 35 (FIG. 7) and to then scan the barcode, e.g. 504, on the back of a color card and to thereafter view the color on the interactive screen by touching a button "3" or adjacent area in another embodiment on the screen 503.

Figure 31:
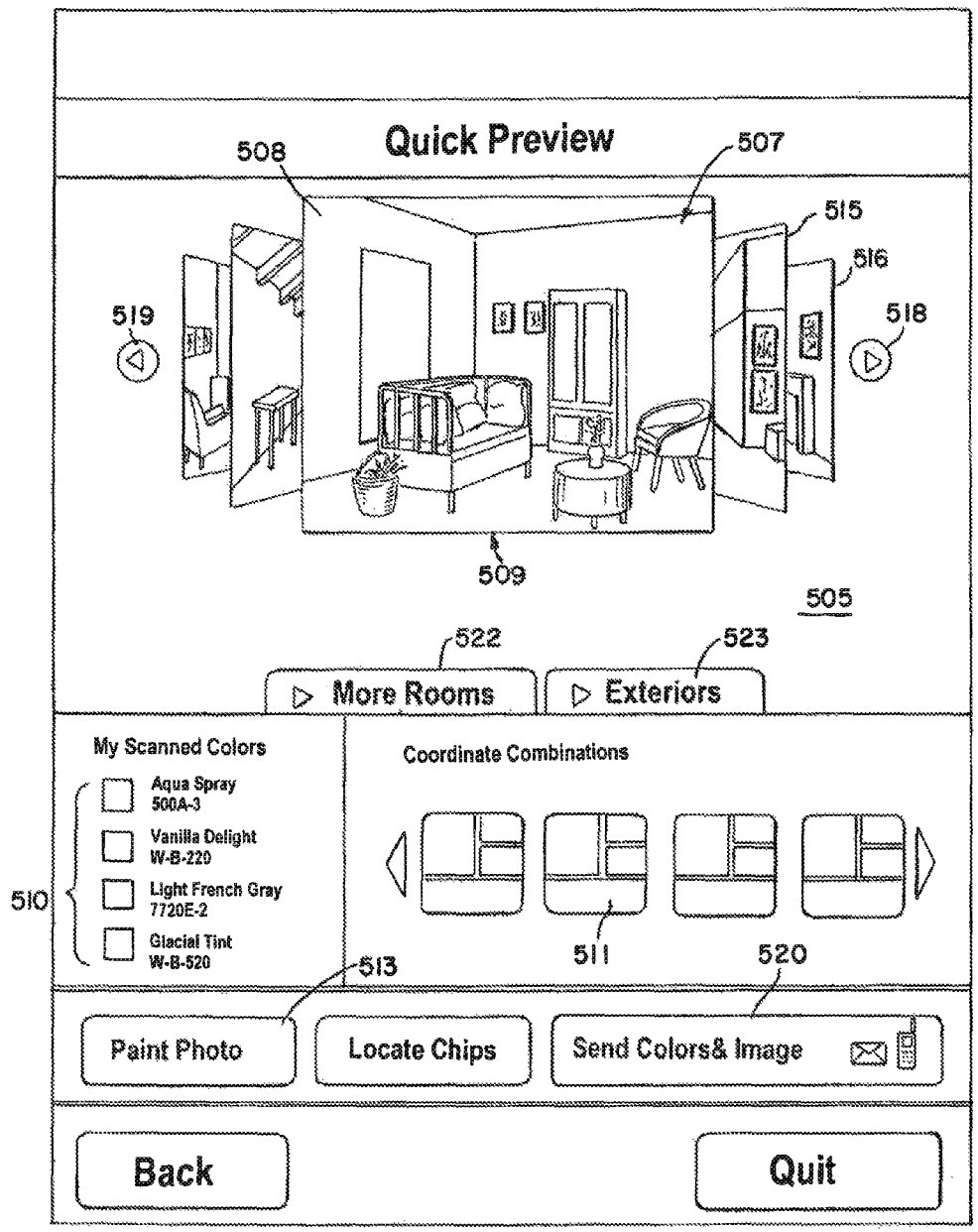
FIG. 31 illustrates a "quick preview" display screen.

FIG. 31 illustrates a "quick preview" screen 505 which displays the bar code color scanned by the customer, which is displayed after the customer touches the button "3" of FIG. 30. An illustrative screen 505 could also be presented automatically after scanning of a color as instructed by screen 503. In one embodiment, the screen 505 allows the customer to scan another color to create a personal color palette 510 by, for example, touching a "scan another color" area 517, to interactively paint the previewed image 509 by touching "paint photo" area 513; to change the preview room to other rooms 515, 516, by touching arrows 518, 519; to select a coordinating palette, e.g. 511, by touching "coordinate colors"; to locate the colors chips in the Color Center by touching a "locate chips" area 514; to send the selected color to an email address or cell phone by touching rectangle 520; or to quit the interactive application or go back to the previous page or screen. A coordinating palette 511 may comprise body, trim and accent colors.

Figure 32:
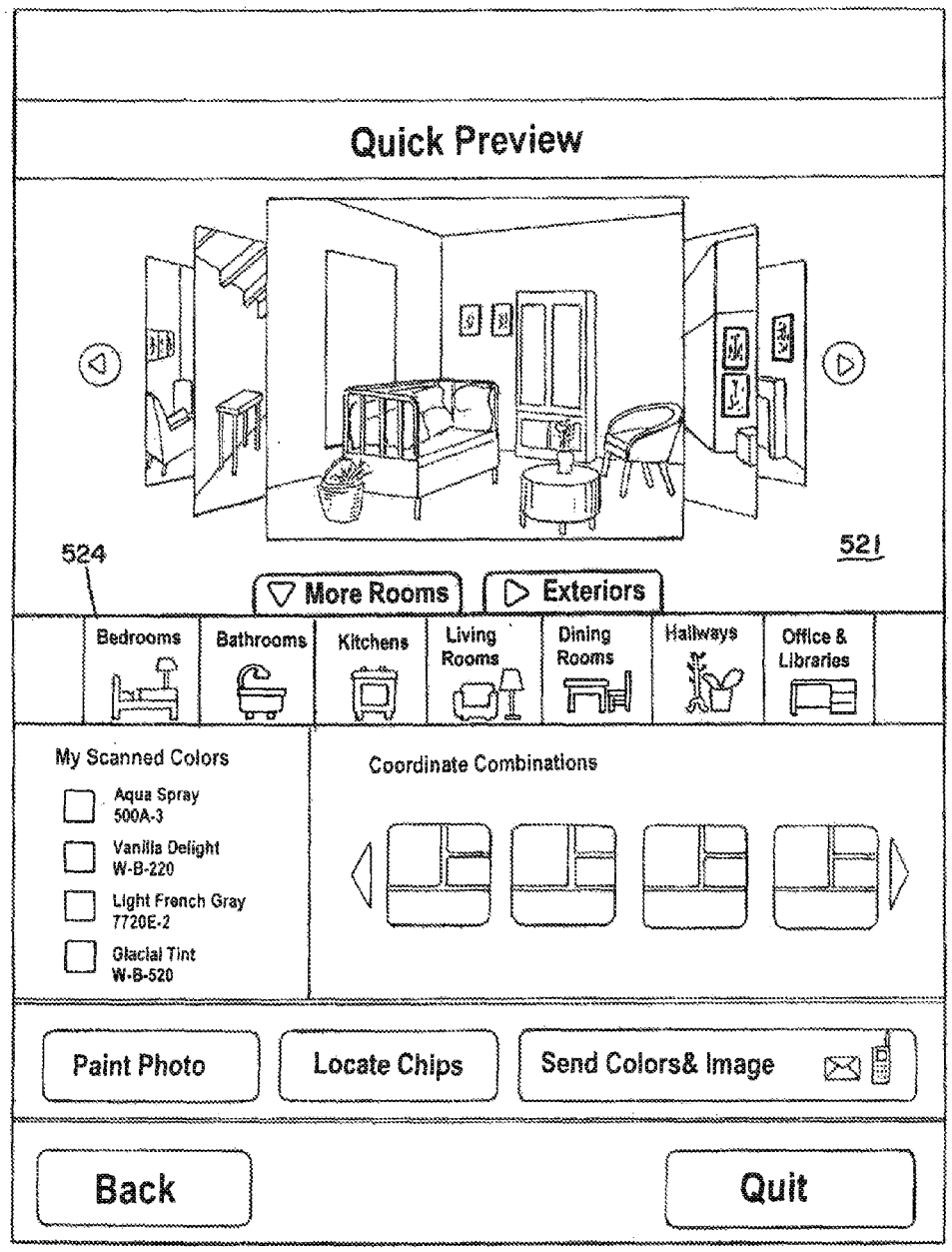
FIG. 32 illustrates a selection display screen.

FIG. 32 illustrates a selection screen 521 with options for the customer to change the room type for the color selected. When a user selects the "More Rooms" button 522 or the "Exteriors" button 523 on the screen 505 of FIG. 31, the screen 521 appears. This screen 521 allows the customer to switch to another room type by touching a room type button, e.g. 524 or to a home exterior by touching area 523, interactively paint the previewed image, change the preview room, select a coordinating palette, e.g. 511, locate the colors chips in the Color Center, send the selected color to an email address or cell phone, or quit the interactive application or go back to the previous page.

Figure 33:
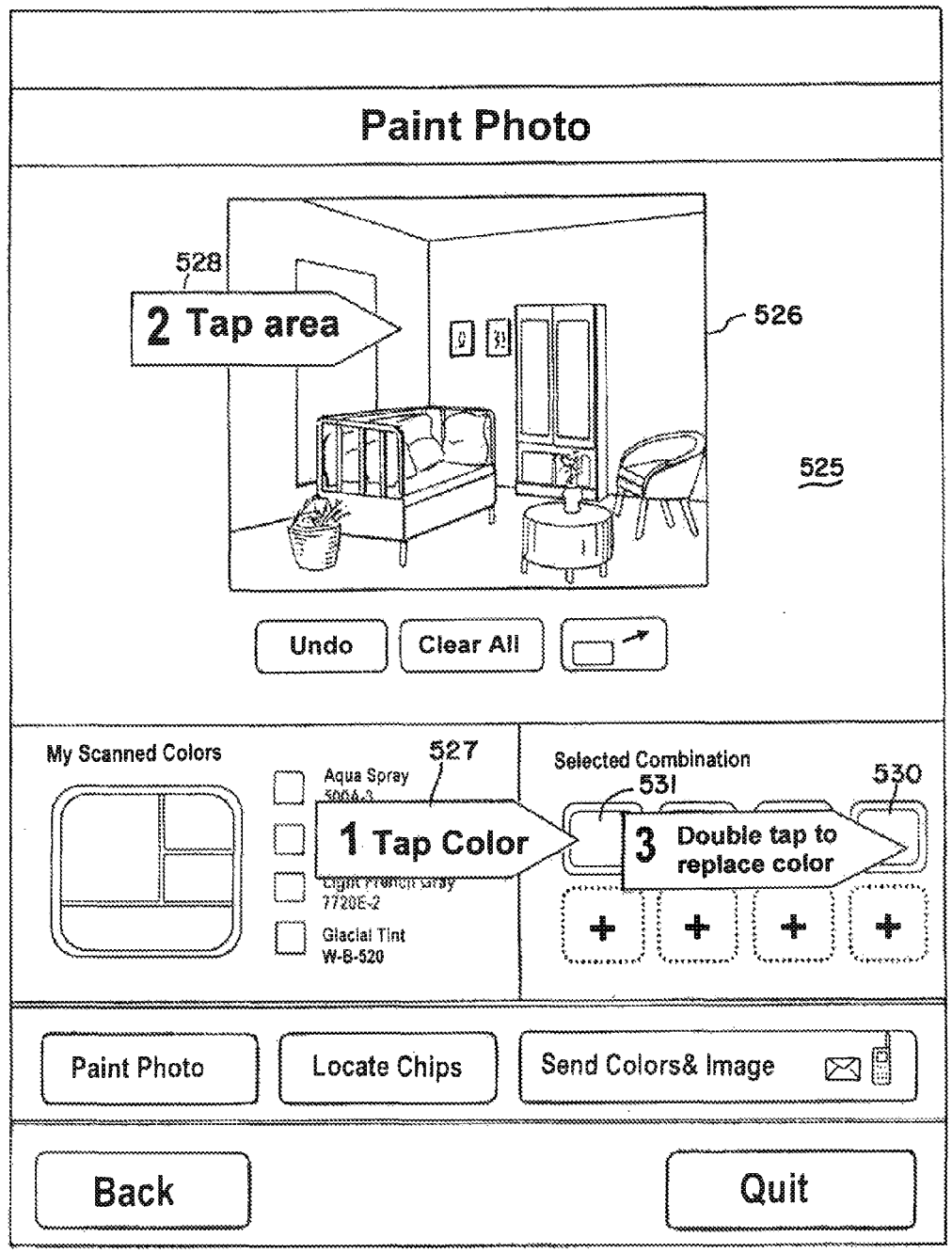
FIG. 33 illustrates a "paint photo" display screen.

FIG. 33 illustrates a "paint photo" screen 525, which is displayed when the customer touches the "paint photo" area 513. This screen 525 instructs the customer how to apply color to the selected room 526. This screen 525 allows the customer to interactively paint the previewed image 509, undo painted selections, clear all colors from the previewed image, enlarge the previewed image, select additional colors to be previewed, locate the colors chips in the Color Center, send the selected color(s) to an email address or cell phone, or quit the interactive application or go back to the previous page. In particular, the screen 525 instructs the customer via a guide arrow 527 to tap a desired color and then apply it to a desired area by touching a second guide arrow 528. A third guide arrow 529 instructs the customer to double tap a color button, e.g. 530, twice, in order to replace the color represented by the color represented by the button 530. By employing the arrows 527 and 528, the customer may, for example, paint the walls 507, 508 of the room image 509 with the color represented by the button 531, which may be, for example, "Aqua Spray." In one embodiment, the arrows 527, 528, 529 may be touch-slid to change their operative position on the screen 525 of FIG. 33.

Figure 34:
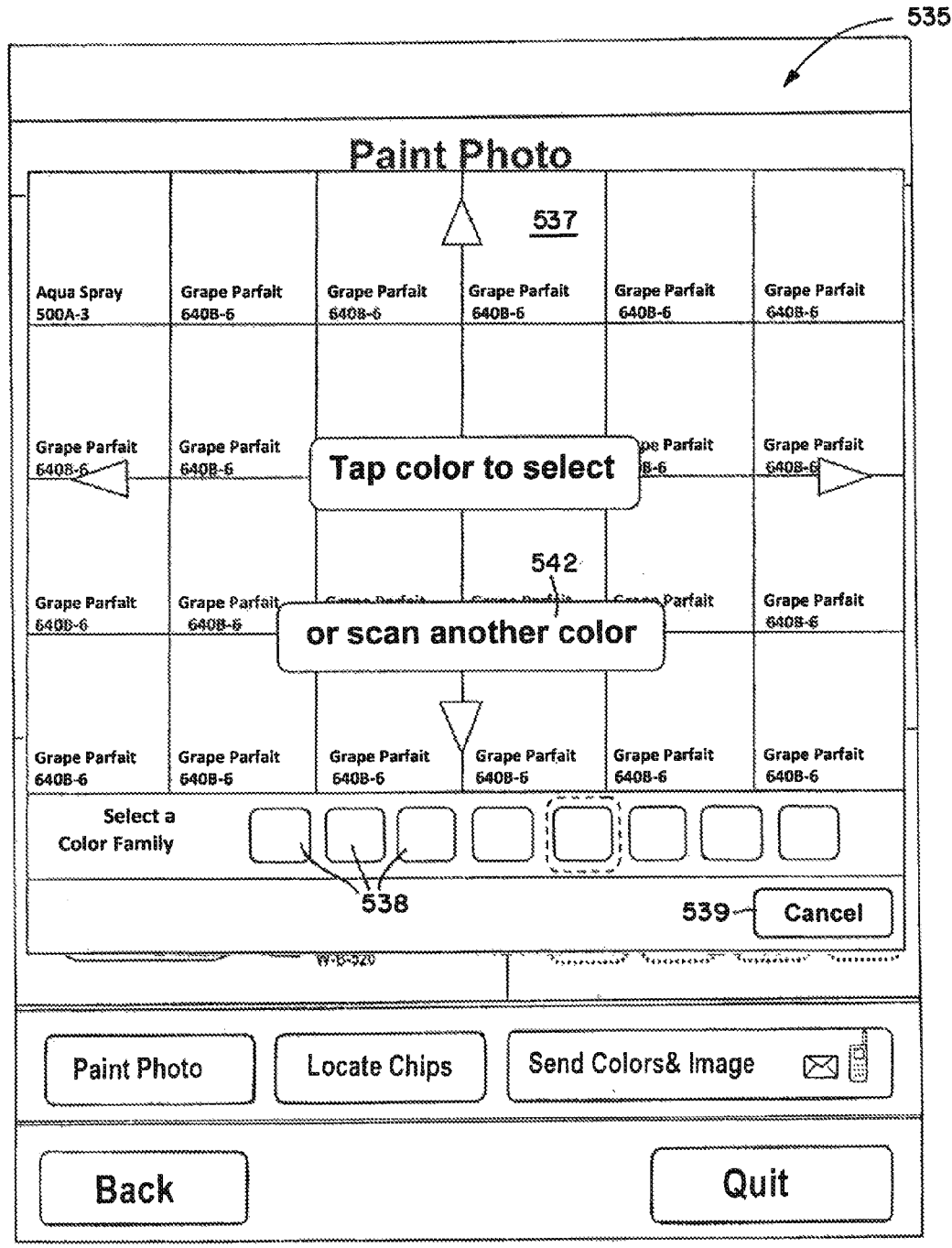
FIG. 34 illustrates a "modify color" display screen.

FIG. 34 illustrates a "modify color" screen 535 with instructions for the customer on how to modify a selected color. In one embodiment, this screen 535 is automatically generated when the customer taps the "replace color" arrow 529 on screen 525 of FIG. 33. In the illustrative embodiment, the screen 535 presents a matrix or array of color squares, e.g. 537, each of which may represent a different shad or color. This screen 535 allows the customer to select a new color by tapping a square, e.g. 537, representing the new color or by scanning another color by tapping area 542, or to change to one of eight color families by touching one of the color family select buttons, e.g. 538, or to cancel the modify color selection by touching "Cancel" 539. After changing color families, a newly displayed square like square 537 may be tapped to select a new color. After selection of a new color, the screen 525 of FIG. 33 may then be redisplayed with the new color selection, for example, by touching the "Back" area of the screen 535.

Figure 35:
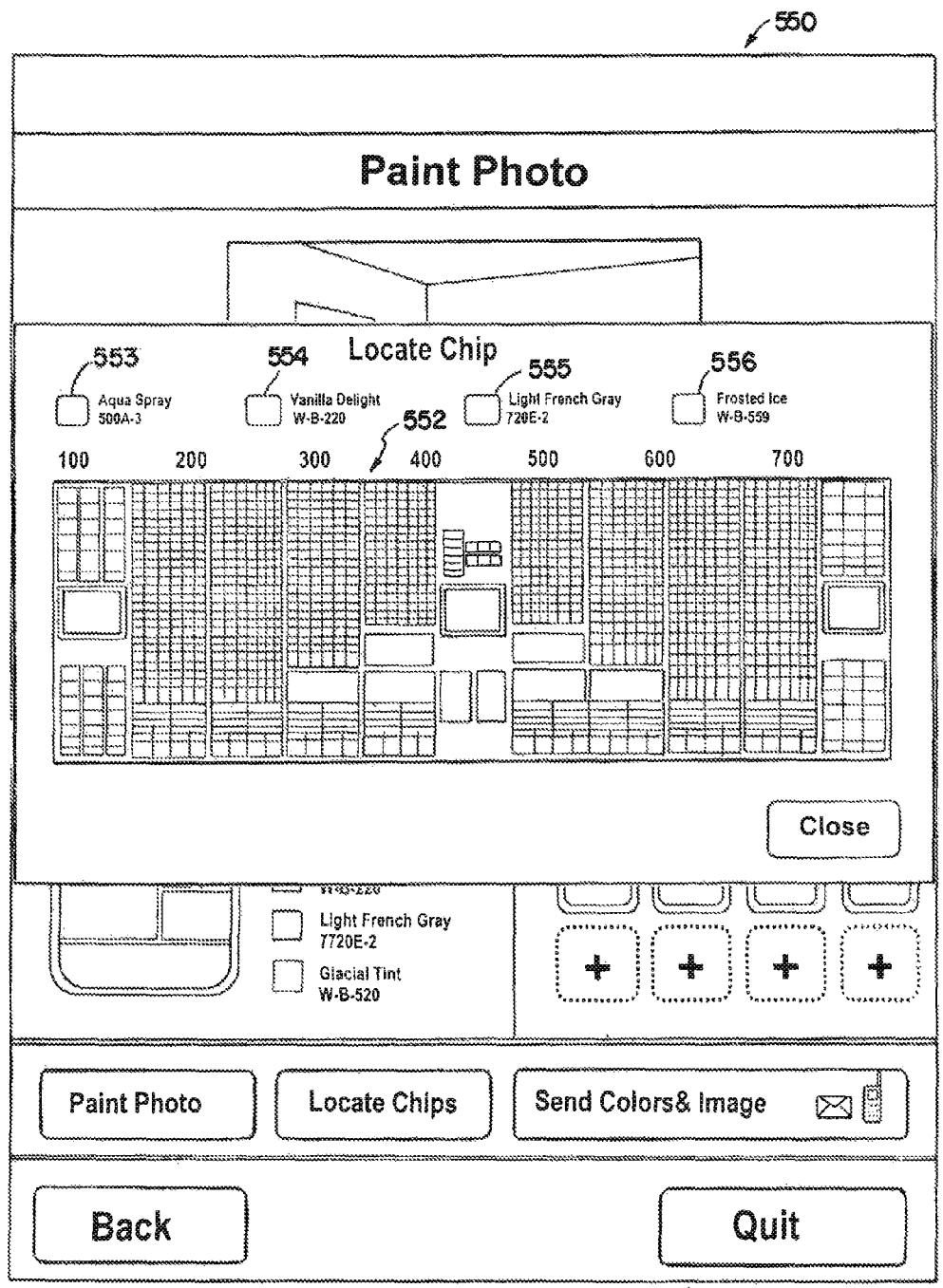
FIG. 35 illustrates a color chip display screen.

FIG. 35 illustrates a color chip screen 550 which shows a customer where to find the physical color cards or chips carrying the selected colors in the physical Color Center, e.g. 35 (FIG. 7). In the illustrative embodiment, the screen 550 of FIG. 35 is automatically displayed when the customer touches the "locate chips" area 514 of any of the other display screens. As shown, a visual representation 552 of the color center layout is provided with the four selected colors 553, 554, 555, 556 arranged above it. In the illustrative embodiment, the display screen 550 "pin points" the precise location of each color chip in the physical display, e.g. 35. The location of each of the colors 553, 554, 555, 556 in the display may be pinpointed, for example, by solid highlighted rectangle areas or highlighted borders around the appropriate rectangles 557, 558, 559, 560 in the display 552.

Figure 36:
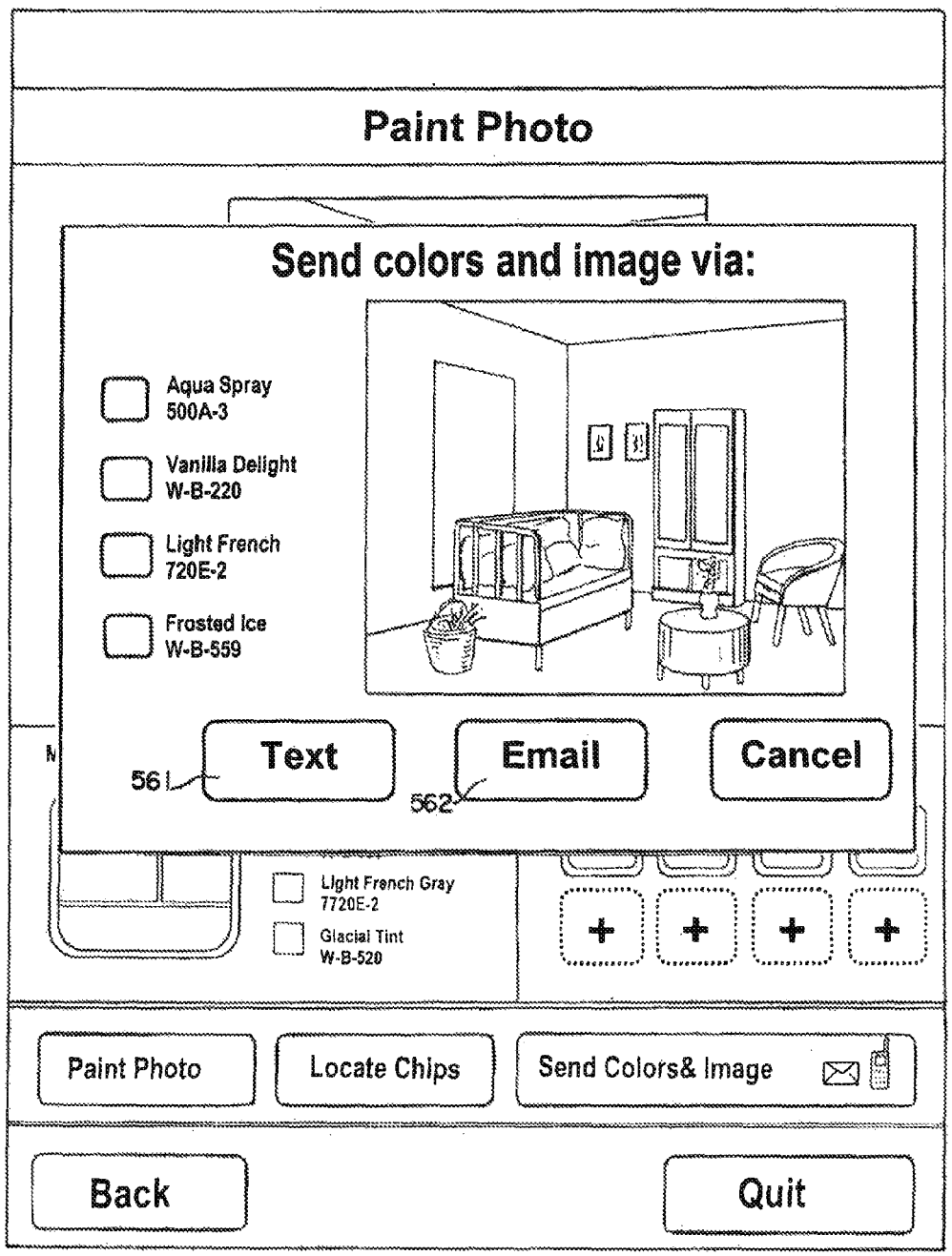
FIG. 36 illustrates a "send colors and image" display screen.
Figure 37:
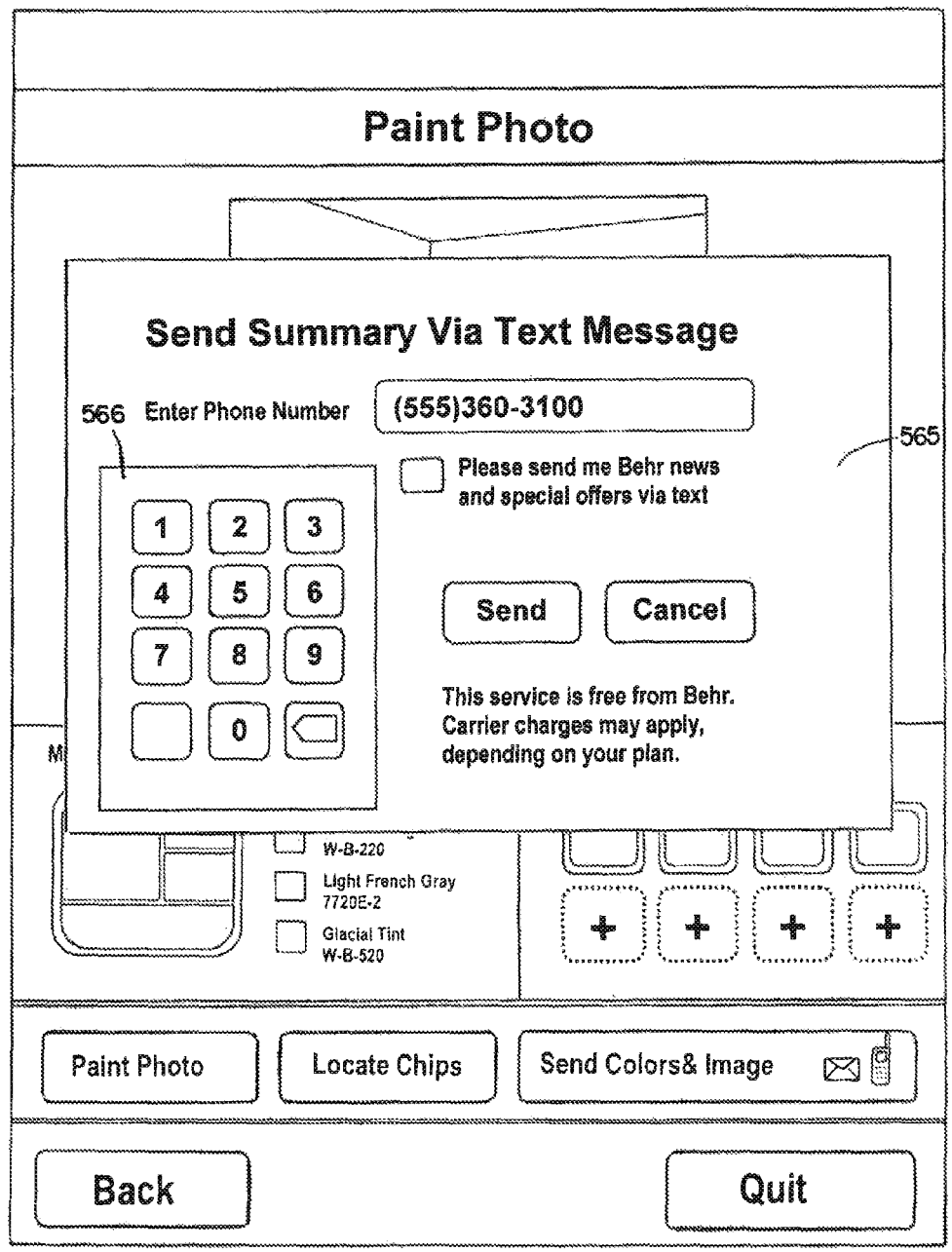
FIG. 37 illustrates a text message display screen.
Figure 38:
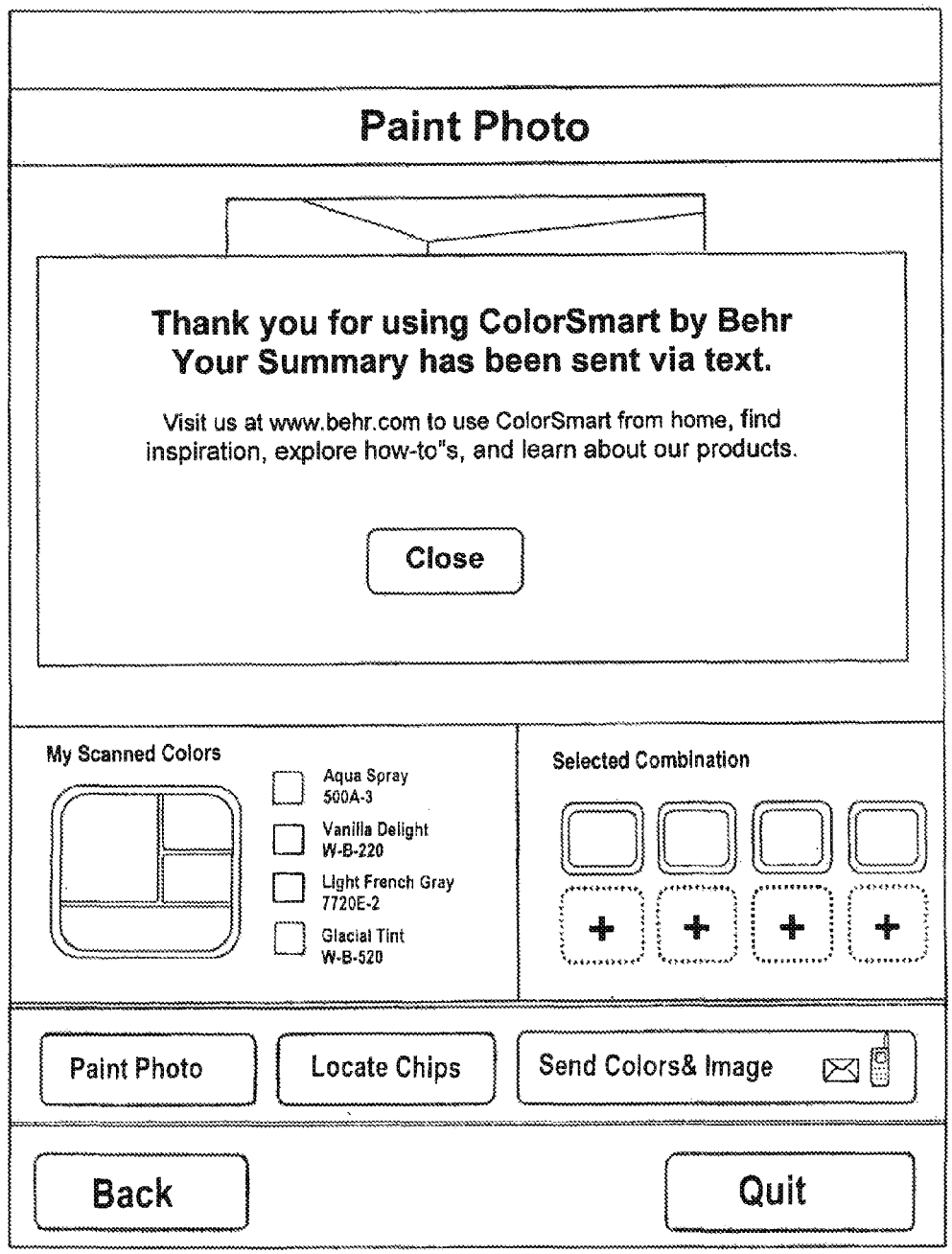
FIG. 38 illustrates a text confirmation display screen.

FIG. 36 illustrates a "send colors and image" screen 560, which gives the customer the option to send his or her project (e.g. four selected colors and "painted" room image) by text message or email by touching appropriate buttons 561, 562. FIG. 37 illustrates a text message screen 565, which gives the customer the option to enter a phone number in order to receive a text message that contains the project summary by touching appropriate keys in a keypad 566. This screen allows the customer to enter the phone number, opt-in for news and special offers from the paint/coatings manufacturer or supplier, send the project, cancel the operation, or view the privacy policy. FIG. 38 illustrates a text message confirmation screen 570, which provides confirmation when the project has been sent.

Figure 39:
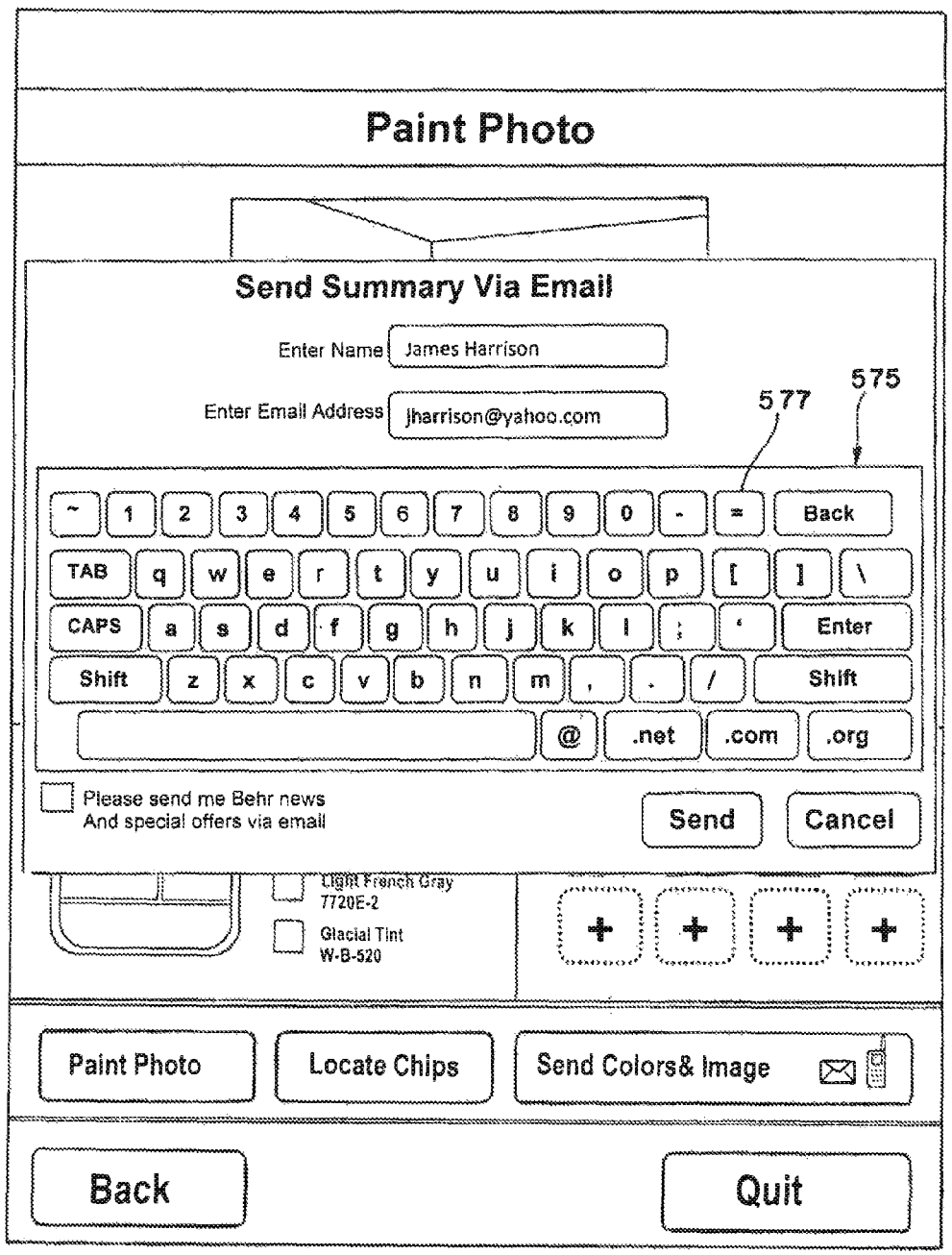
FIG. 39 illustrates an email display screen.
Figure 40:
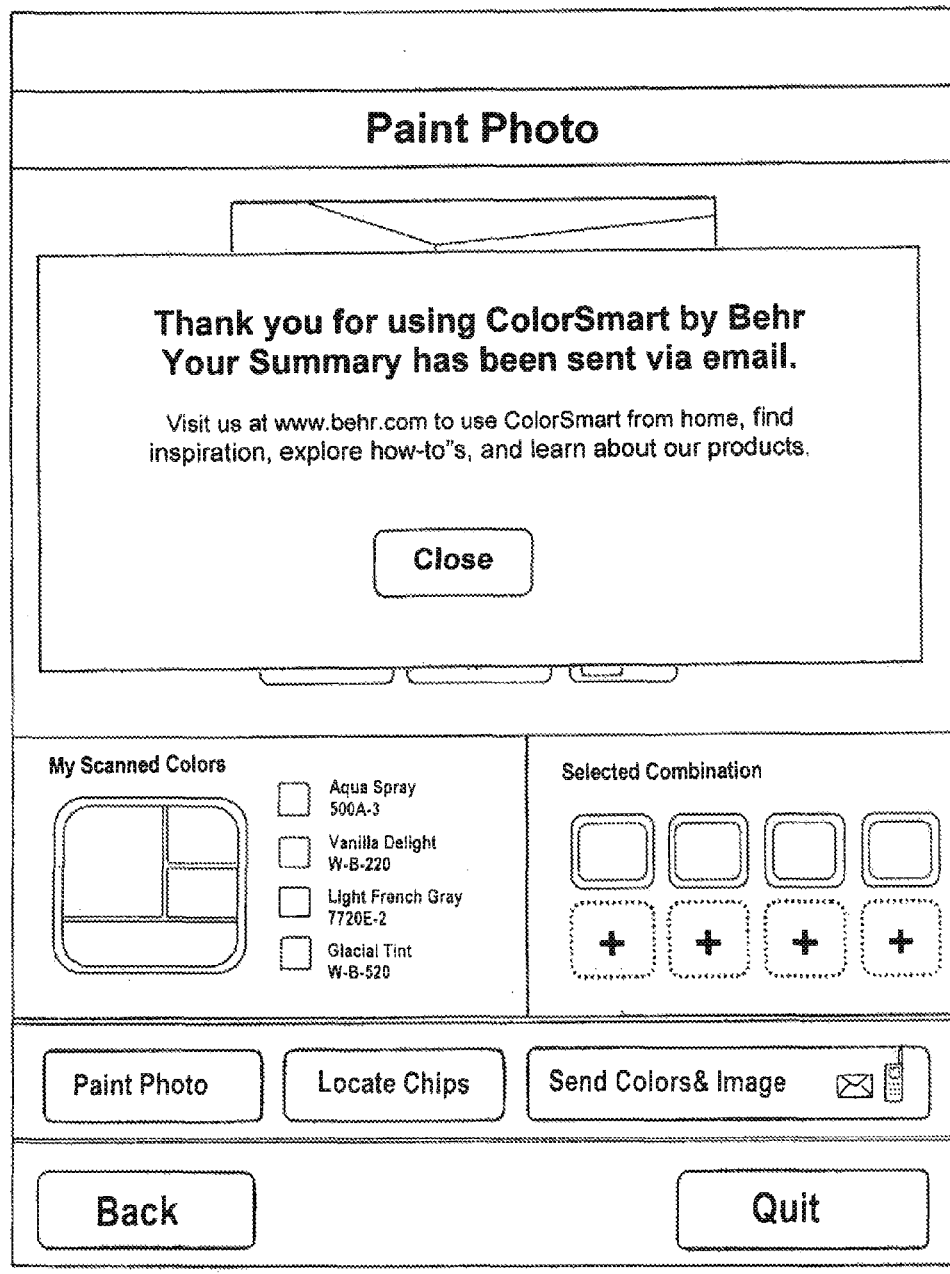
FIG. 40 illustrates an email confirmation display screen.

FIG. 39 illustrates an email screen 575, which gives the customer the option to enter his or her email address via touch keyboard 577 to receive an email that contains the project summary. This screen allows the customer to enter a name and email address, opt-in for news and special offers from the paint/coatings manufacturer or supplier, send the project, cancel, or view the privacy policy. FIG. 40 illustrates an email confirmation screen, which provides confirmation when the project has been sent.

Figure 41:
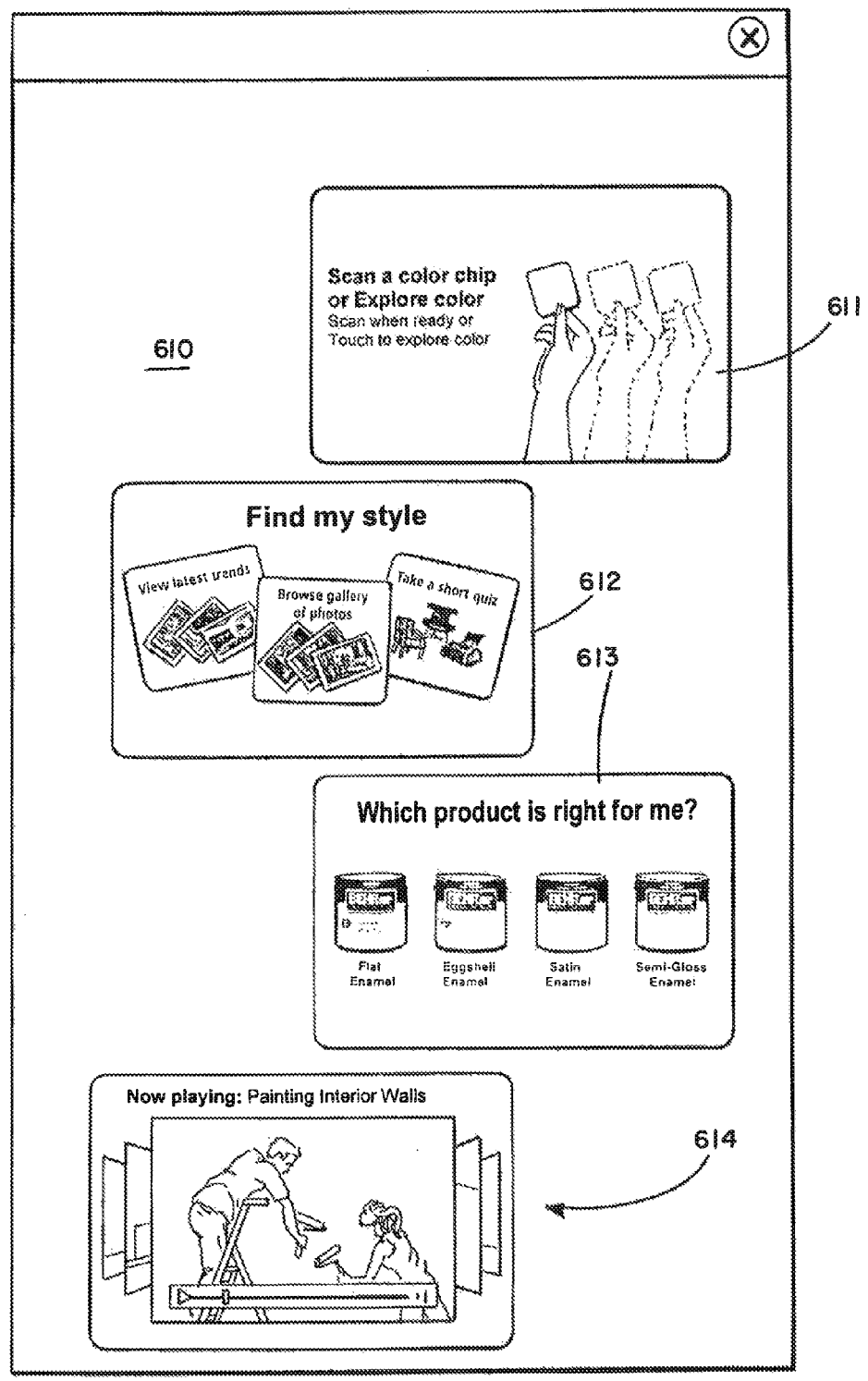
FIG. 41 illustrates an informational attract loop display screen of an illustrative Kiosk monitor interactive application.

FIG. 41 illustrates an illustrative informational attract loop screen 610 employed to introduce the customer to the interactive application presented and available at the kiosk terminal 333. This screen 610 invites the customer to use a color selection application by touching an area 611, find a specific color style by touching an area 612, learn about products of the paint/coatings manufacturer or supplier by touching an area 613, and view how-to video clips by touching a screen area 614.

Figure 42:
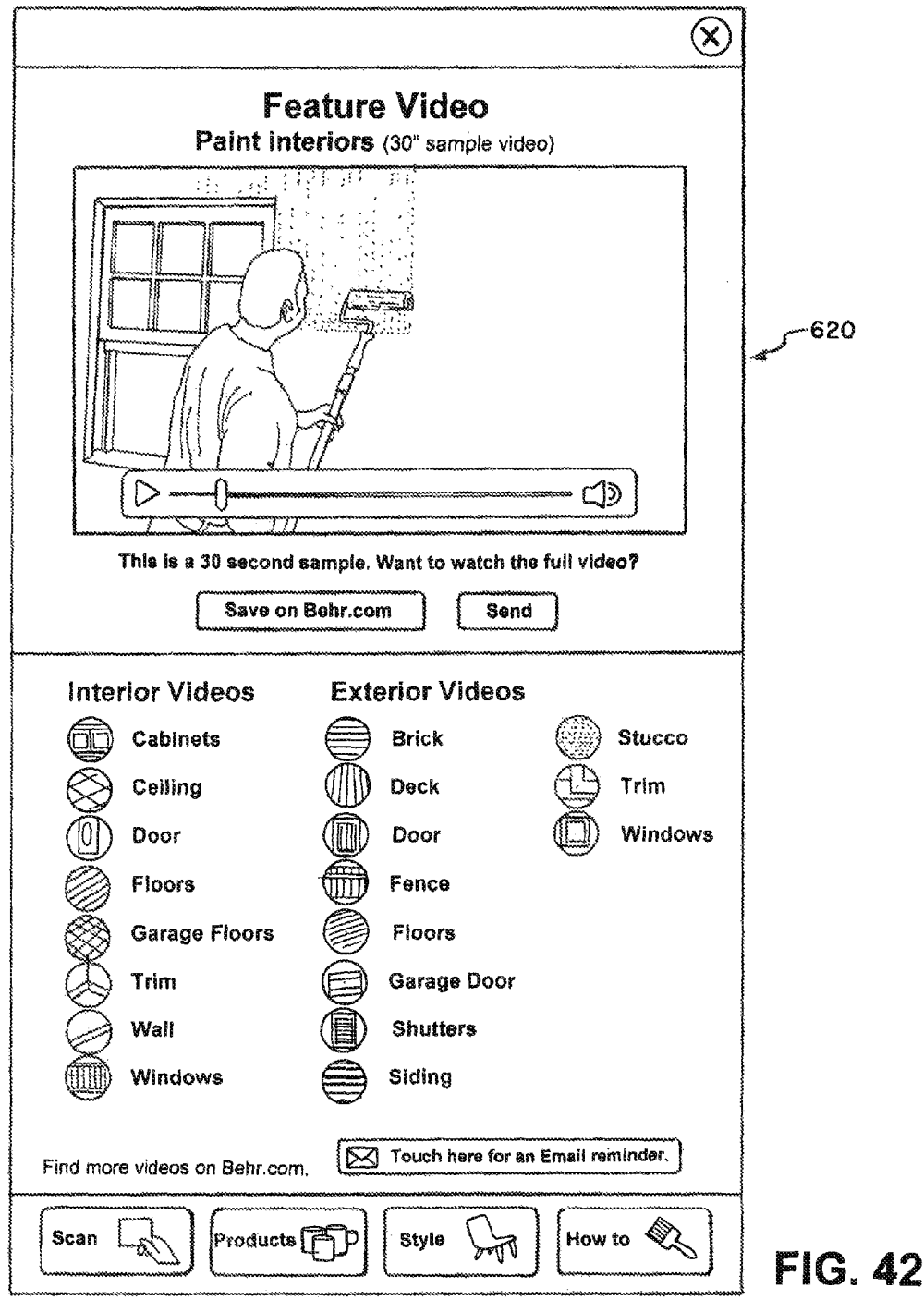
FIG. 42 illustrates a "how to" display screen of the illustrative Kiosk application.

FIG. 42 illustrates a "how-to" featured video screen 620 generated when a customer/user touches area 614 of FIG. 41. This screen 620 enables the customer to view interior and exterior "how-to" videos by project type by touching appropriate buttons, save a selected video to a website-stored workbook, send the video to an email address or a cell phone, or switch to another interactive category.

Figure 43:
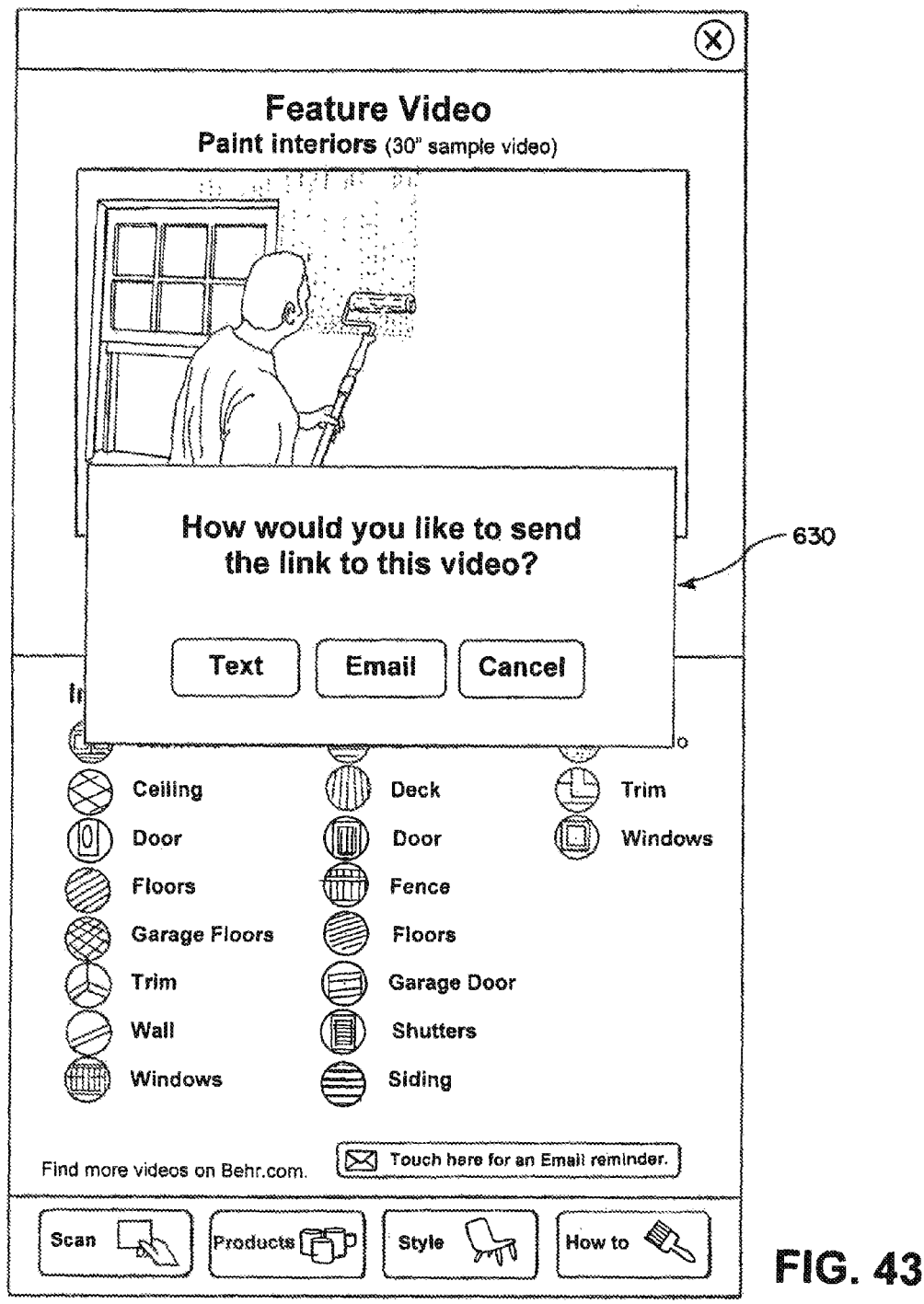
FIG. 43 illustrates a "send video" display screen.
Figure 44:
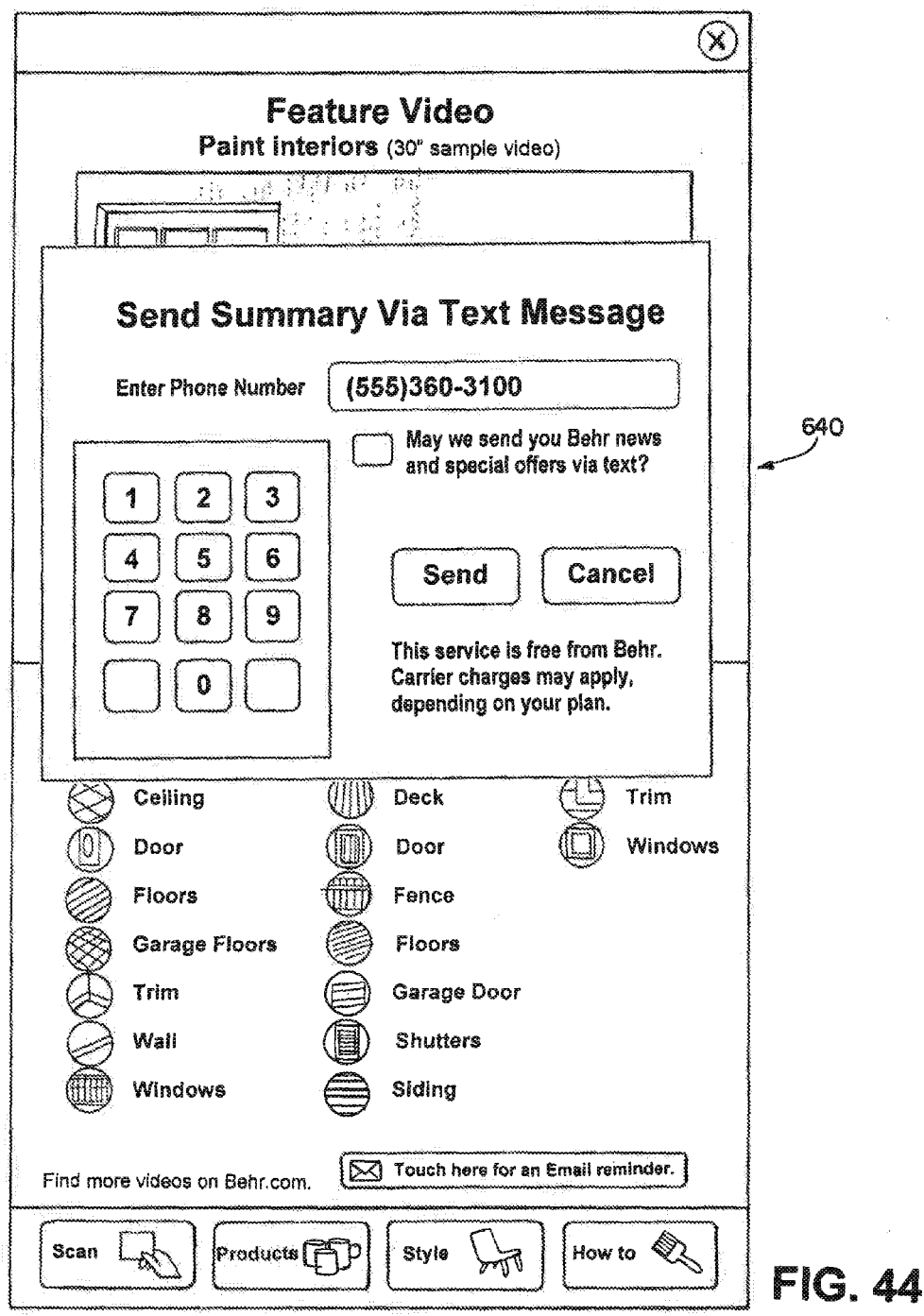
FIG. 44 illustrates a text message display screen.
Figure 45:
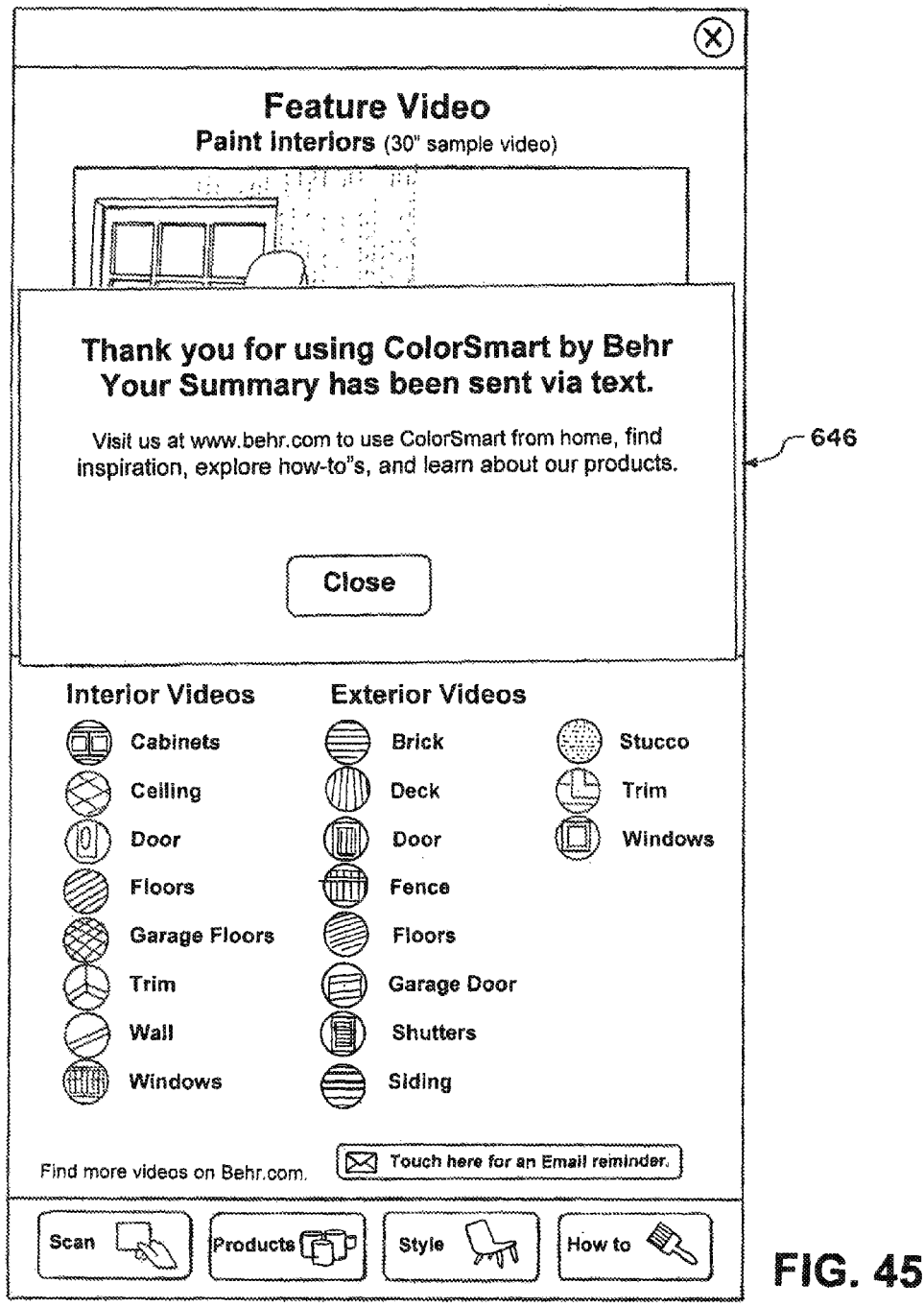
FIG. 45 illustrates a text confirmation display screen.

FIG. 43 illustrates a "send video" screen 630 enabling the customer to elect to send a link to a selected video through text message or email, or cancel out of the selection. FIG. 44 illustrates a text message screen 640 which allows the customer the option to enter a phone number to send the video link, and/or opt-in for manufacturer news and special offers, or cancel out of this selection. FIG. 45 illustrates a text message confirmation screen 646, which provides confirmation that the video link (and other information, if requested) has been sent.

Figure 46:
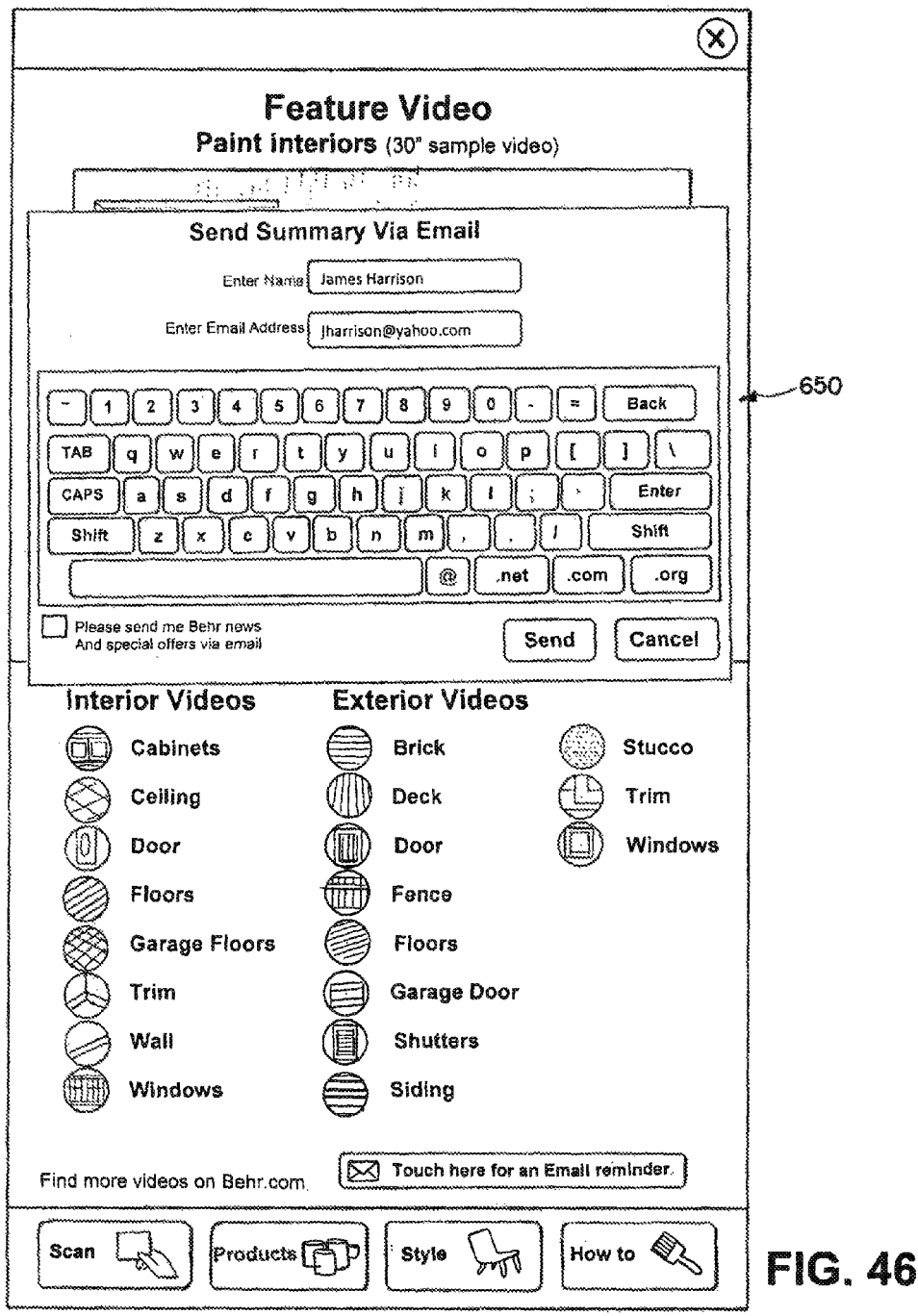
FIG. 46 illustrates an email display screen.
Figure 47:
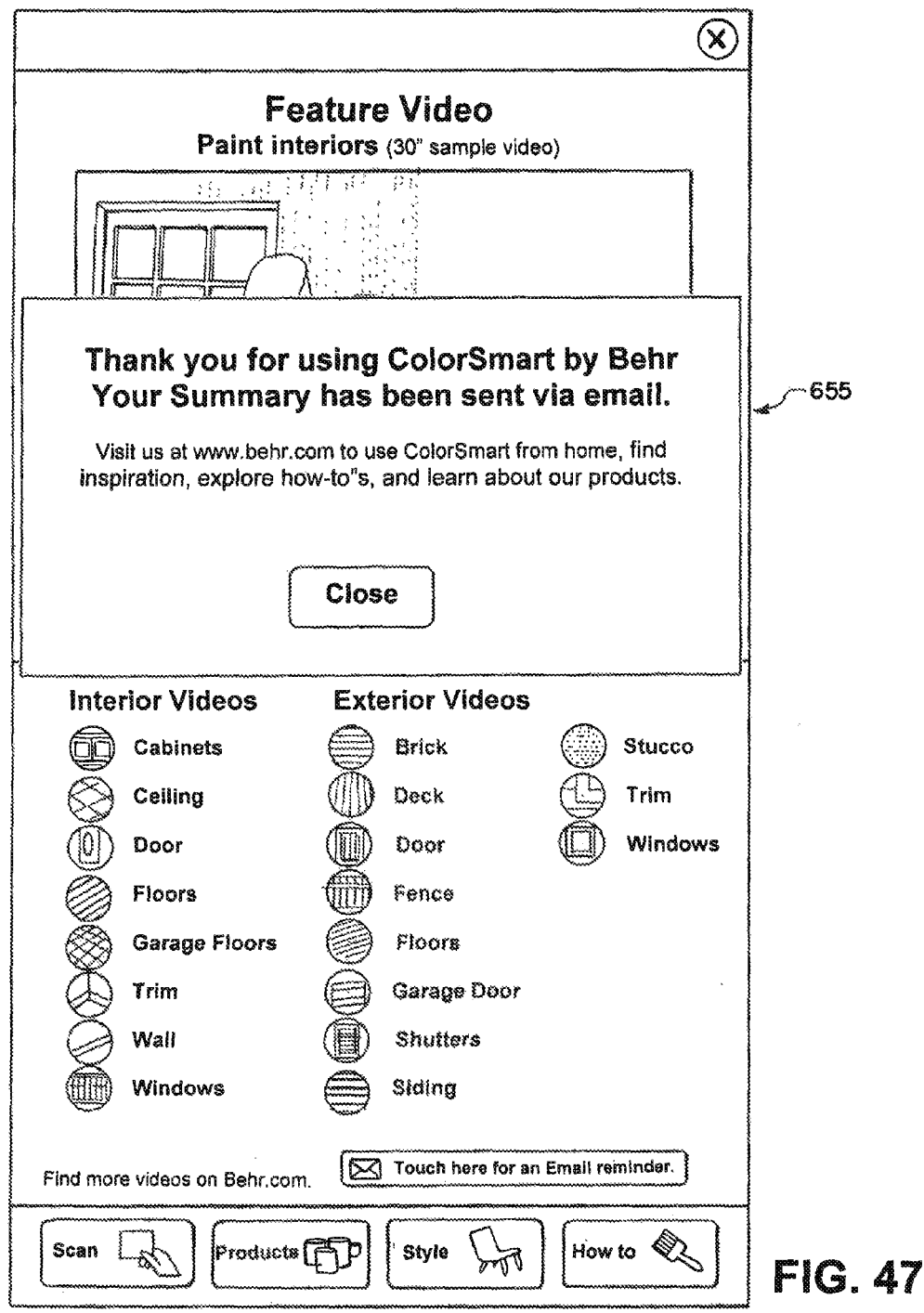
FIG. 47 illustrates a email confirmation display screen.

FIG. 46 illustrates an email screen 650 which allows the customer to enter a name and email address to receive the video information, opt-in for news and special offers, send the video link, or cancel out of the selection. FIG. 47 illustrates an email confirmation screen 655, which provides confirmation when the video link has been sent.

Figure 48:
FIG. 48 illustrates a product categories display screen.
Figure 49:
FIG. 49 illustrates an initial interior paints display screen.

FIG. 48 illustrates a product categories screen 660 generated when the customer/user touches the area 613 of FIG. 41. This screen 660 enables the customer to select a Product Category by touching a button in areas 661, 663, take a quiz to find the right product to use for a project by touching area 664, find out about the Weekly Featured Product by touching area 665, see a product comparison by touching area 667, or switch to another interactive category by touching one of three areas, "scan", "style" or "how to" along the bottom edge of the screen 660. FIG. 49 illustrates an ultra interior paints screen 670, which allows the customer to select the a paint product that he or she would like to learn about.

Figure 50:
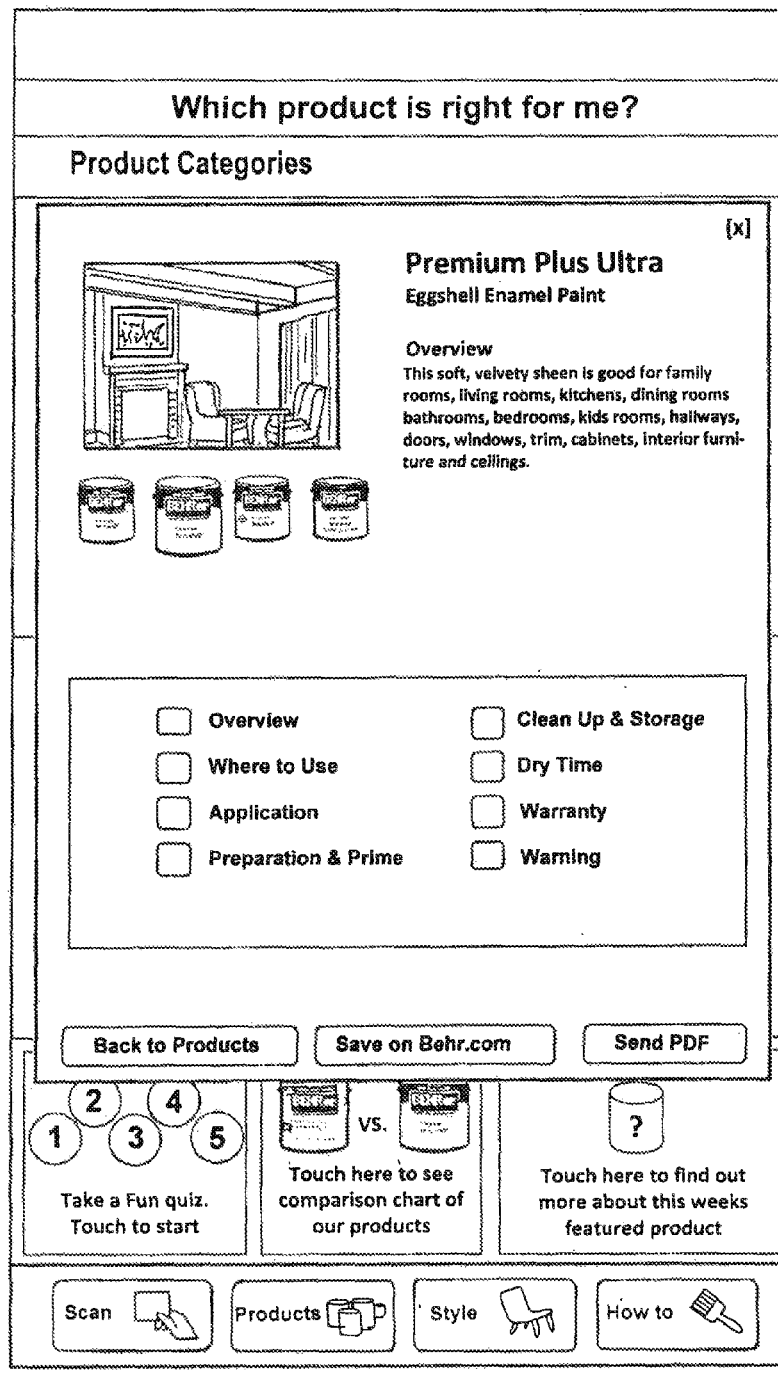
FIG. 50 illustrates a premium plus display screen.

FIG. 50 illustrates a premium plus ultra interior eggshell enamel screen 675, which allows the customer to touch respective areas to read an overview about a specific product selected on screen 670, switch to other features about the specific product, go back to the previous page, save the product information on a website storage facility, or send a PDF version of the product information through text message or email.

Figure 51:
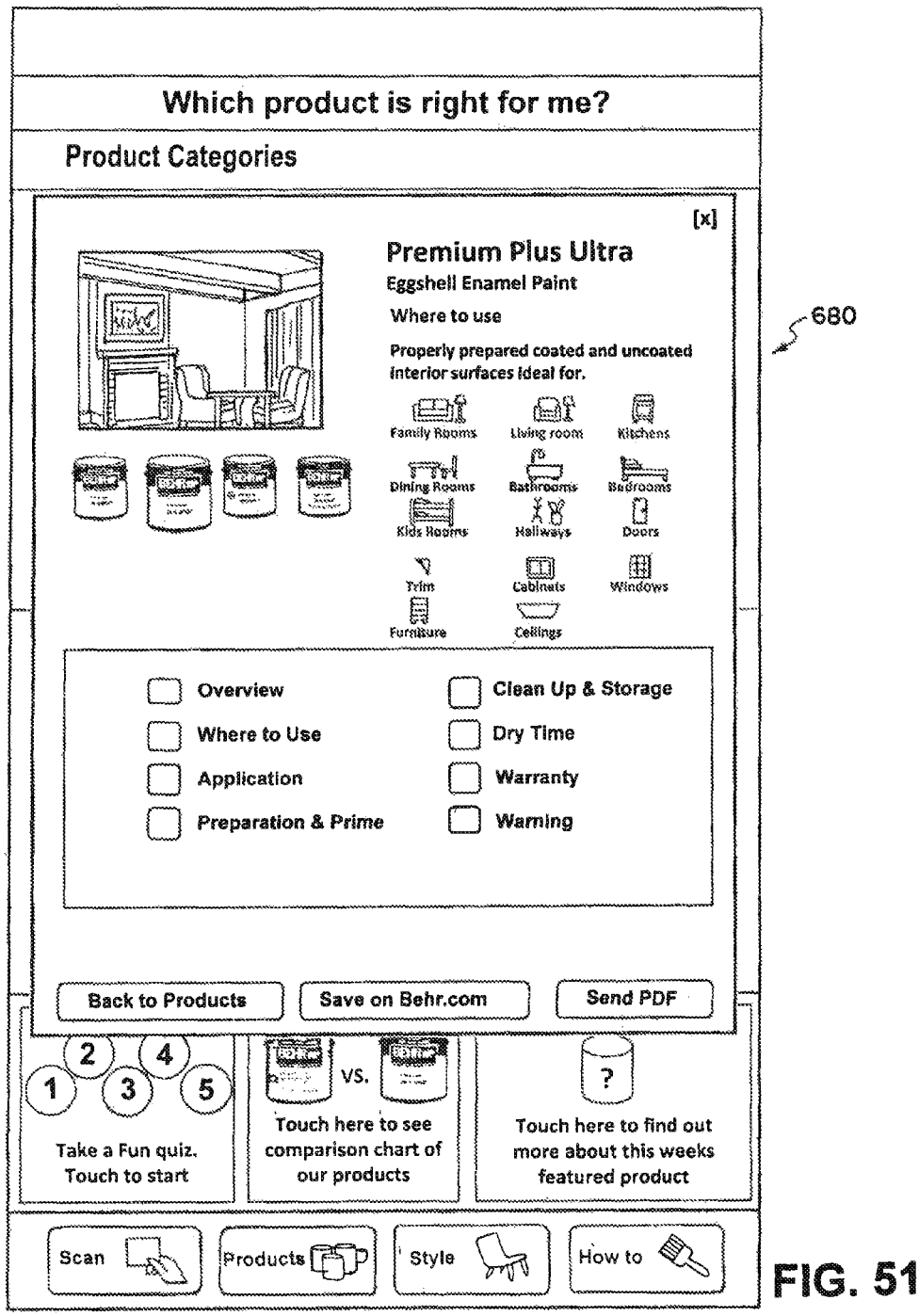
FIG. 51 illustrates a "where to use" display screen.

FIG. 51 illustrates a premium plus ultra eggshell enamel "where to use" screen 680, which allows the customer to touch respective areas to enable the customer to read the suggested areas where the product can be applied, switch to other features about the specific product, go back to the previous page, save the product information to a paint manufacturer's website storage facility, or send a PDF version of the product information through text message or email, for example, by using screens similar to those shown in FIGS. 43 to 47.

Figure 52:
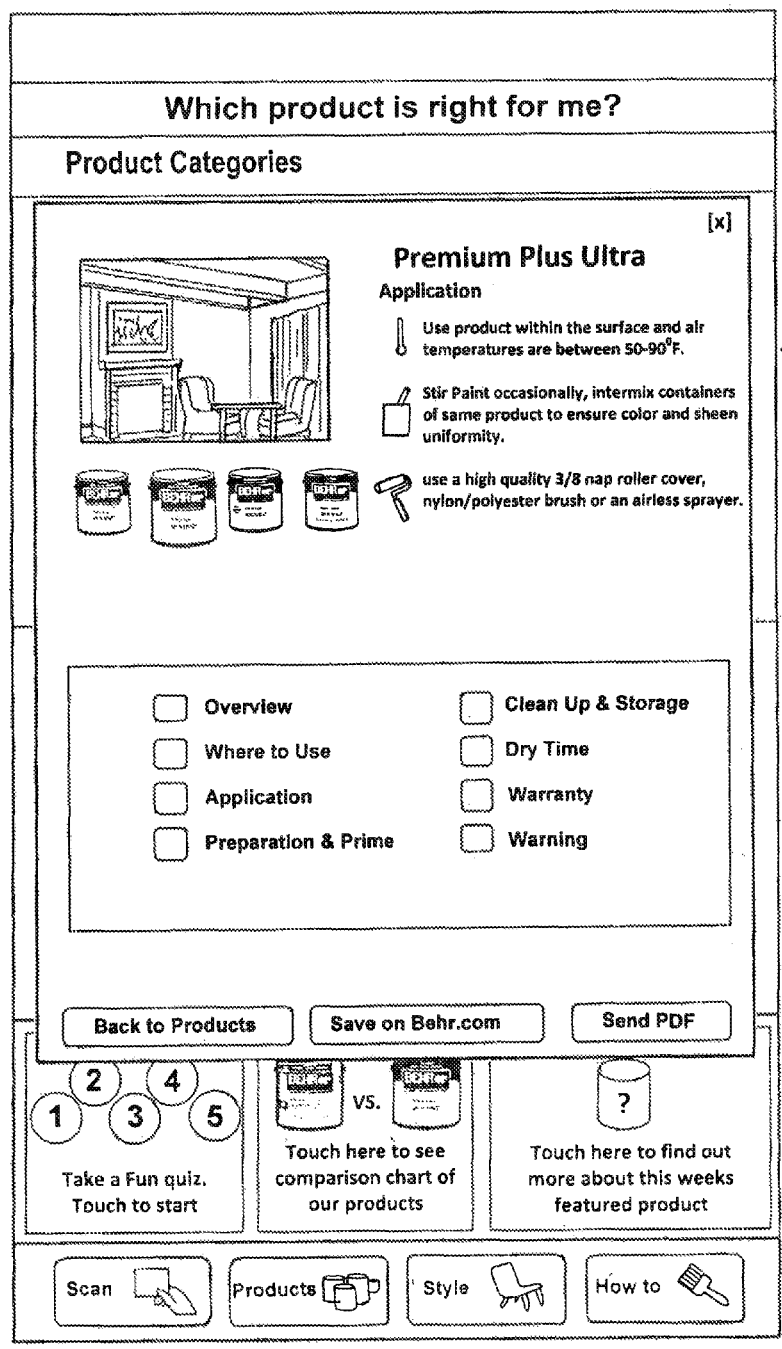
FIG. 52 illustrates a premium plus application display screen.

FIG. 52 illustrates a premium plus ultra eggshell enamel application screen 685, which allows the customer to touch respective areas to enable the customer to read the suggested process for applying the product, switch to other features about the specific product, go back to the previous page, save the product information to a website storage facility, send a PDF version of the product information through text message or email.

Figure 53:
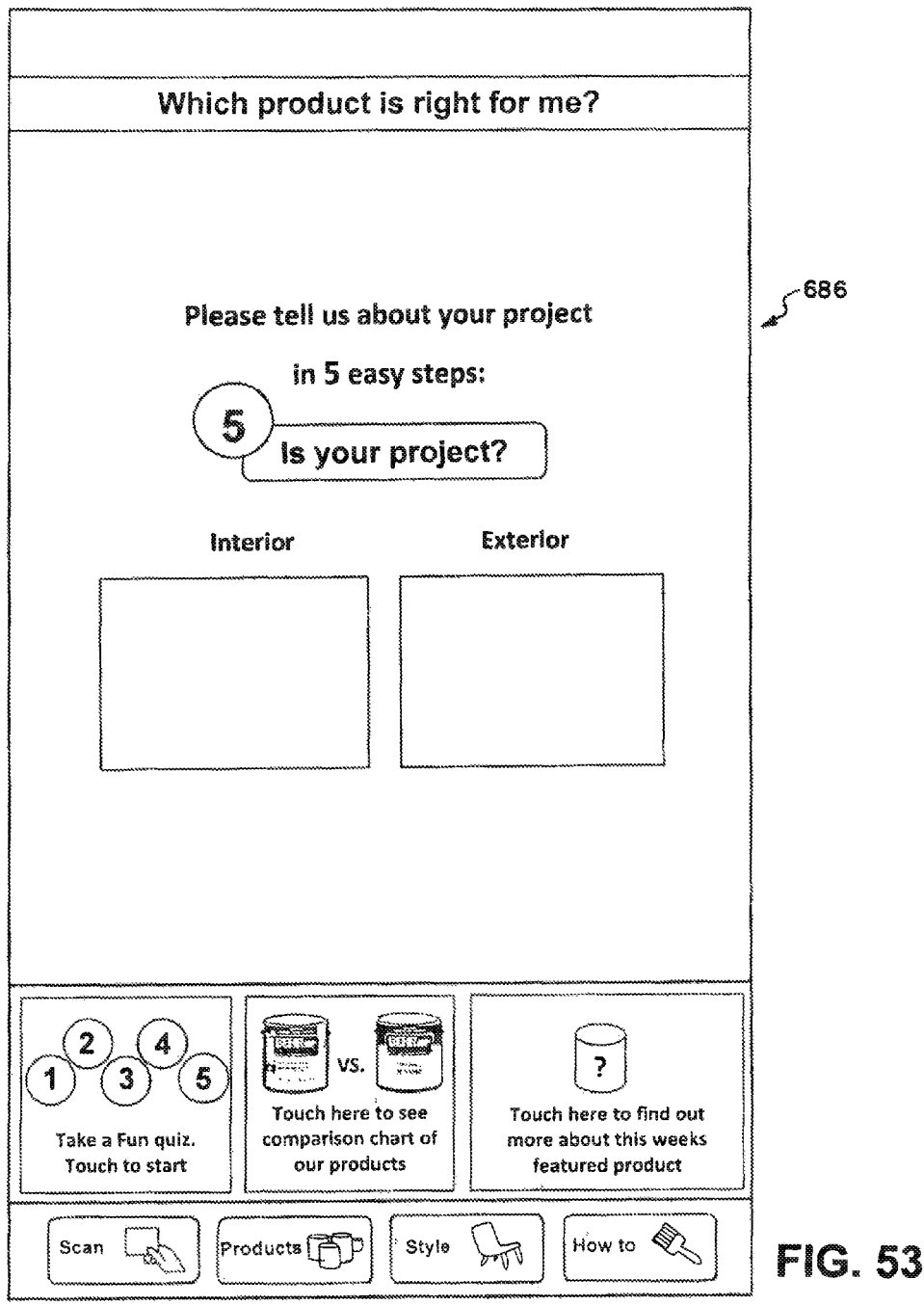

FIGS. 53-58 illustrate screens of an illustrative product quiz, which may be presented after the customer touches the "take a fun quiz" area 644 of the screen of FIG. 48. FIG. 53 illustrates a screen 686, which asks the first question for the product finder quiz: "Which product is right for me?" This screen 686 enables the customer to determine if the project is interior or exterior, switch to the product comparison application, find out about the Weekly Featured Product, and switch to another interactive category by touching respective touch sensitive areas of the display 686.

Figure 54:
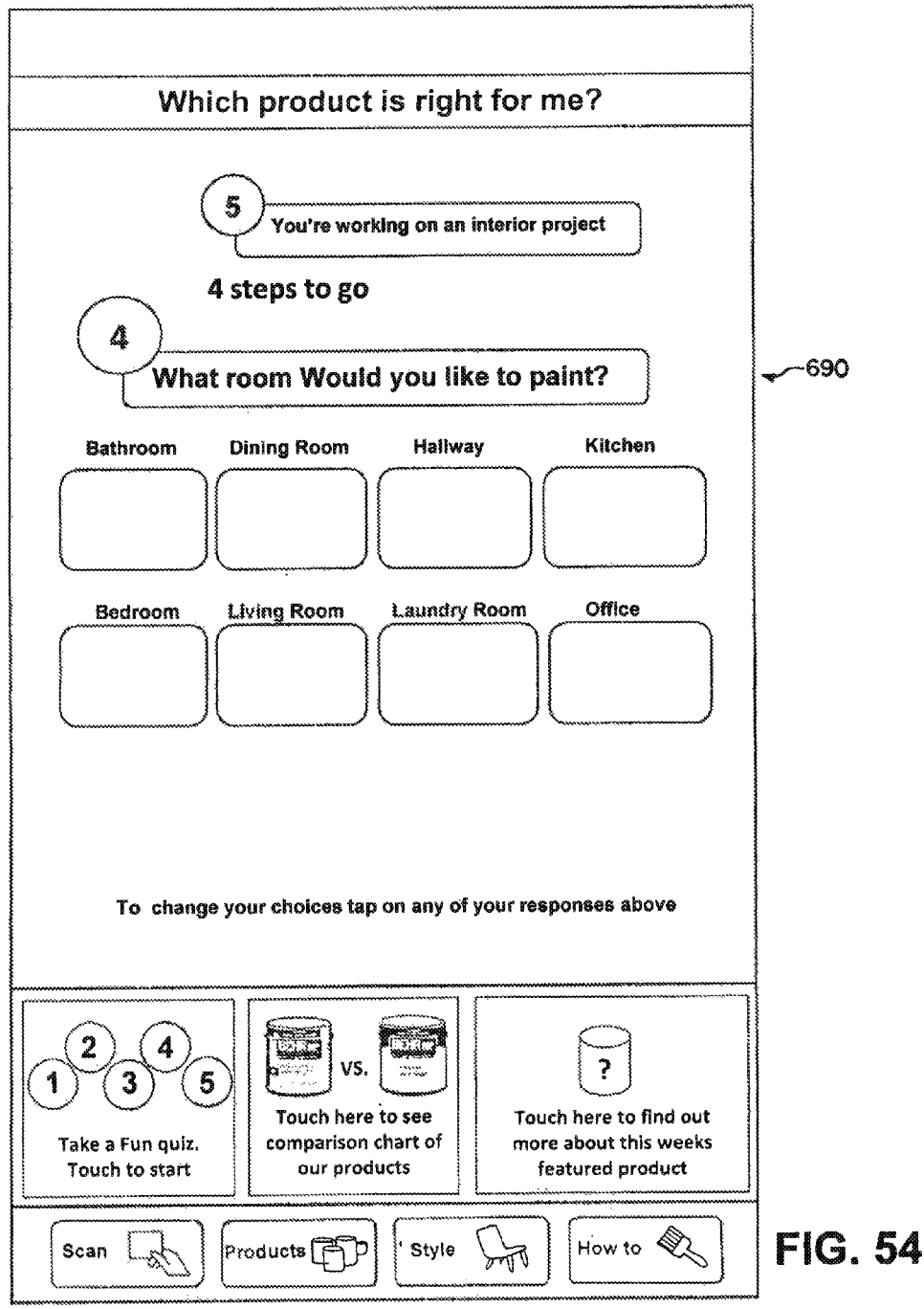

FIG. 54 illustrates a room screen 690, which represents the second question for the product finder quiz. This screen 690 enables the customer to determine the interior location for the project, switch to the product comparison application, find out about the Weekly Featured Product, or switch to another interactive category by touching respective touch sensitive areas of the display 690.

Figure 55:
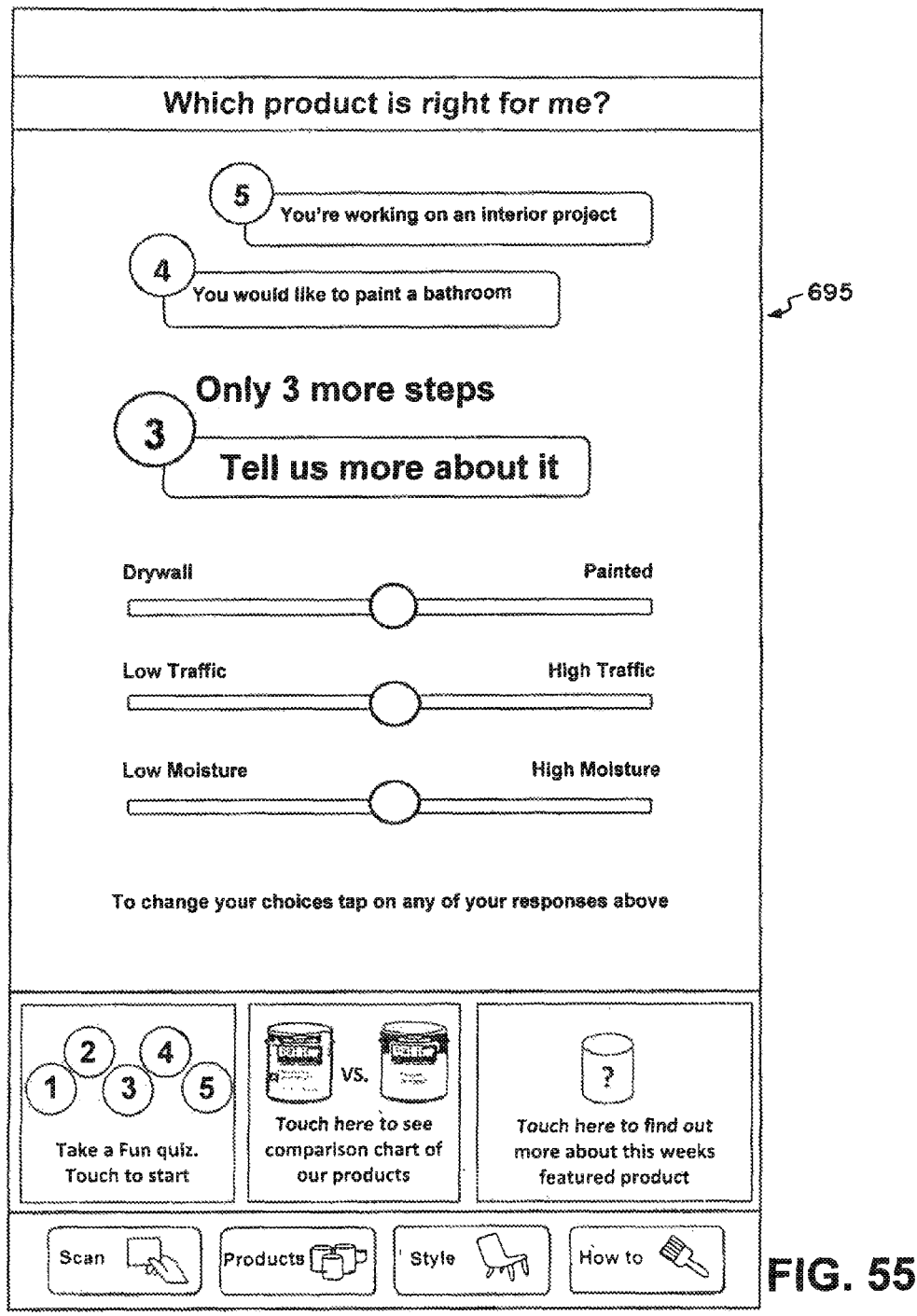

FIG. 55 illustrates a room features screen 695, which represents the third question for the product finder quiz. This screen 695 enables the customer to determine the nature and condition of the interior project, switch to the product comparison application, find out about the Weekly Featured Product, and switch to another interactive category by touching respective areas of the screen 695.

Figure 56:
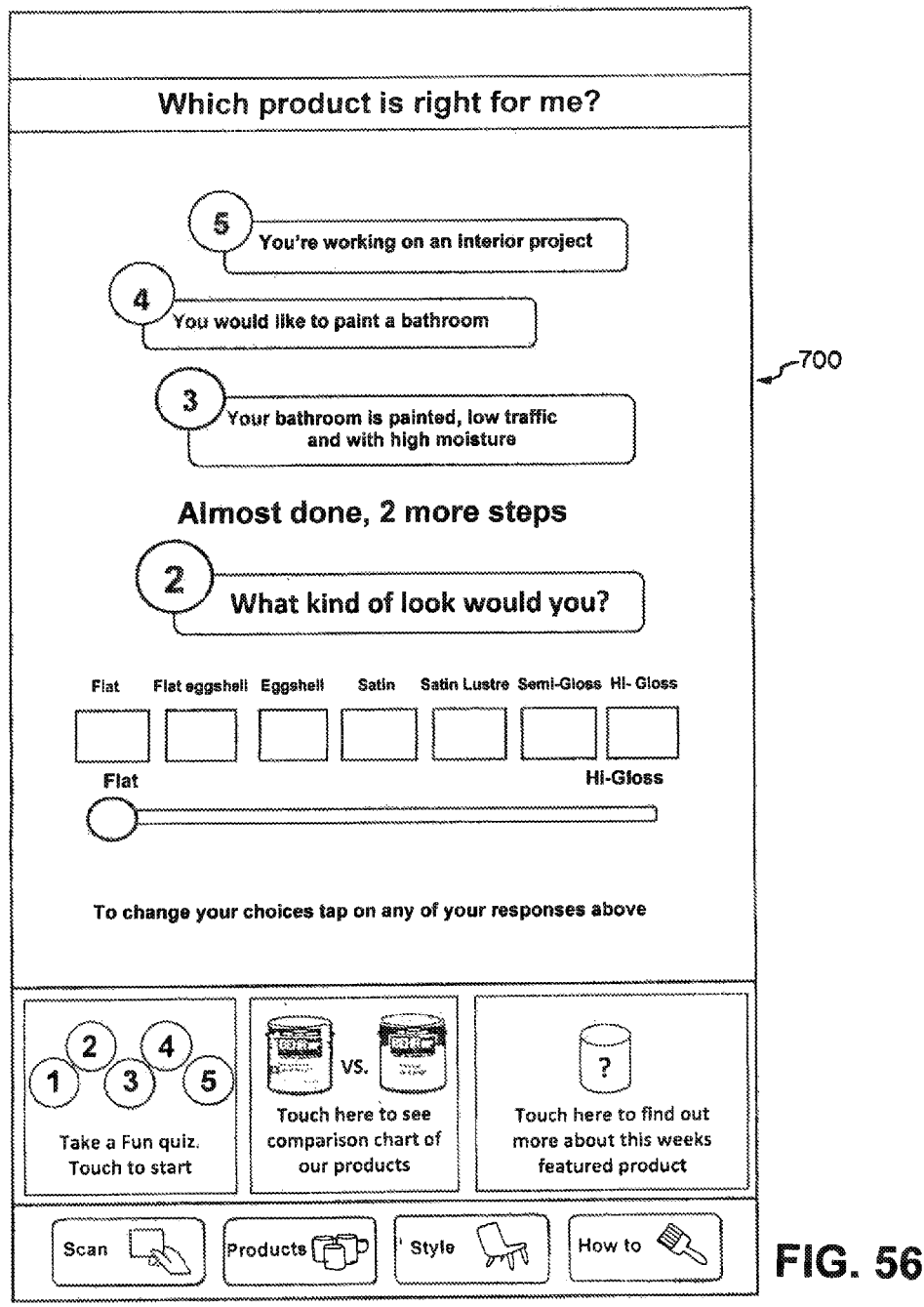

FIG. 56 illustrates a sheen selection screen 700, which represents the fourth question for the product finder quiz. This screen 700 enables the customer to determine the desired sheen finish for the interior project, switch to the product comparison application, find out about the Weekly Featured Product, or switch to another interactive category by touching respective touch sensitive areas of the screen 700.

Figure 57:
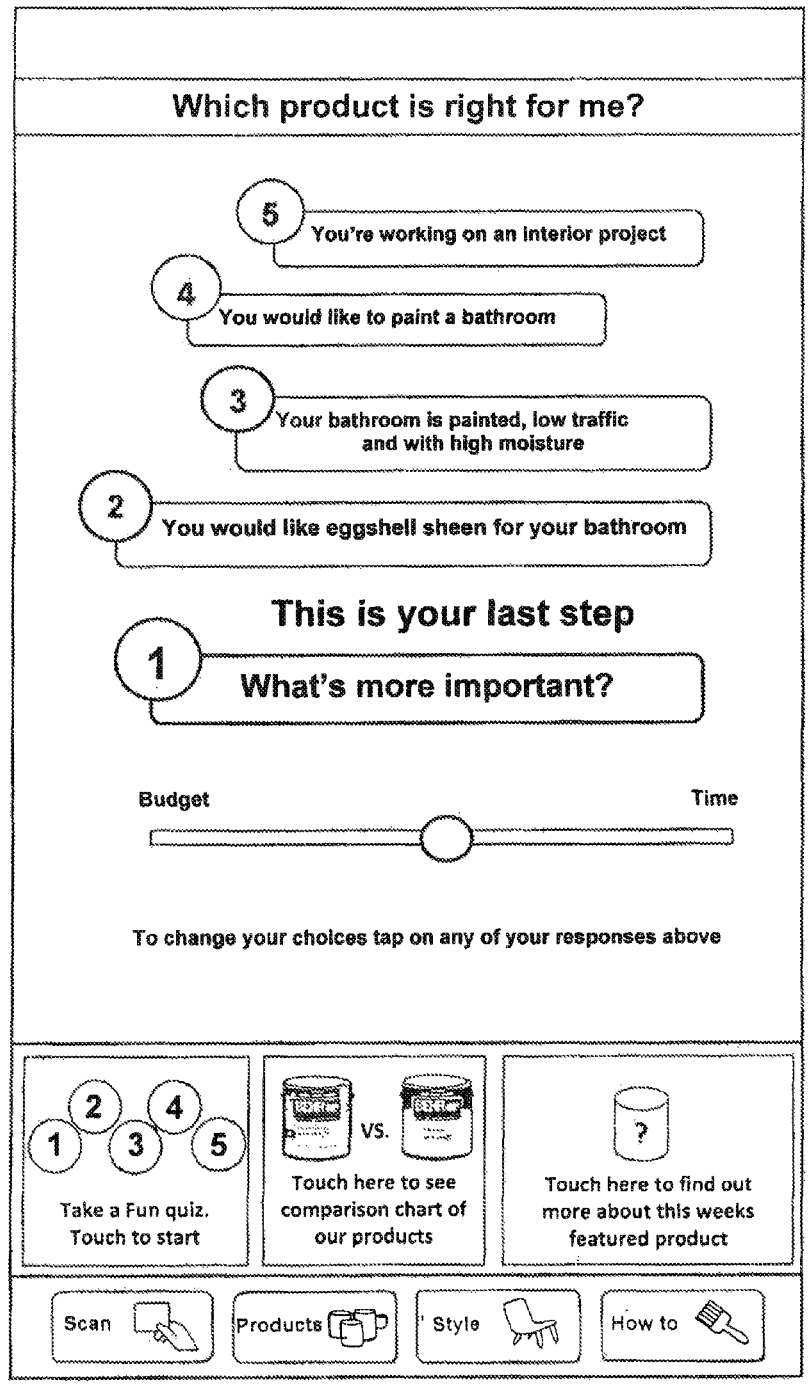

FIG. 57 illustrates a paint requirements screen 705 for the product finder quiz. This screen 705 enables the customer to determine the correct proportion between budget and time for the interior project by, for example, moving the circle or "cursor" on a horizontal line having "budget" at one end and "time" at the other, switch to the product comparison application, find out about the Weekly Featured Product, or switch to another interactive category by touching respective touch sensitive areas of the screen 705.

Figure 58:
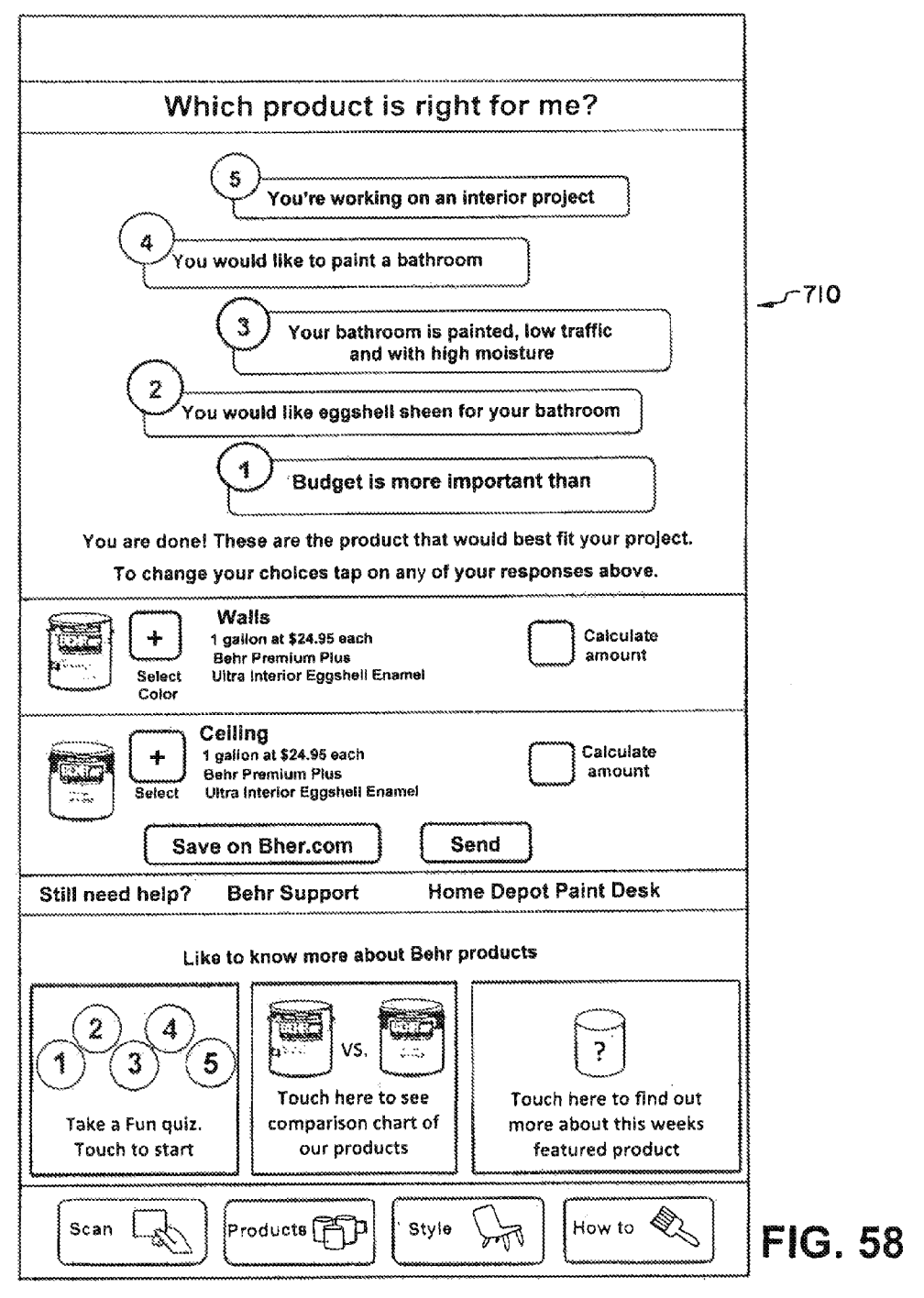

FIG. 58 illustrates a paint recommendations screen 710, which provides the result or "answers" for the product finder quiz. This screen 710 allows the customer to view the recommended product. It further enables the customer to save the results to a website, send the result by text message or email, switch to the product comparison application, find out about the Weekly Featured Product, or switch to another interactive category by touching respective areas of the display screen 710.

Figure 59:
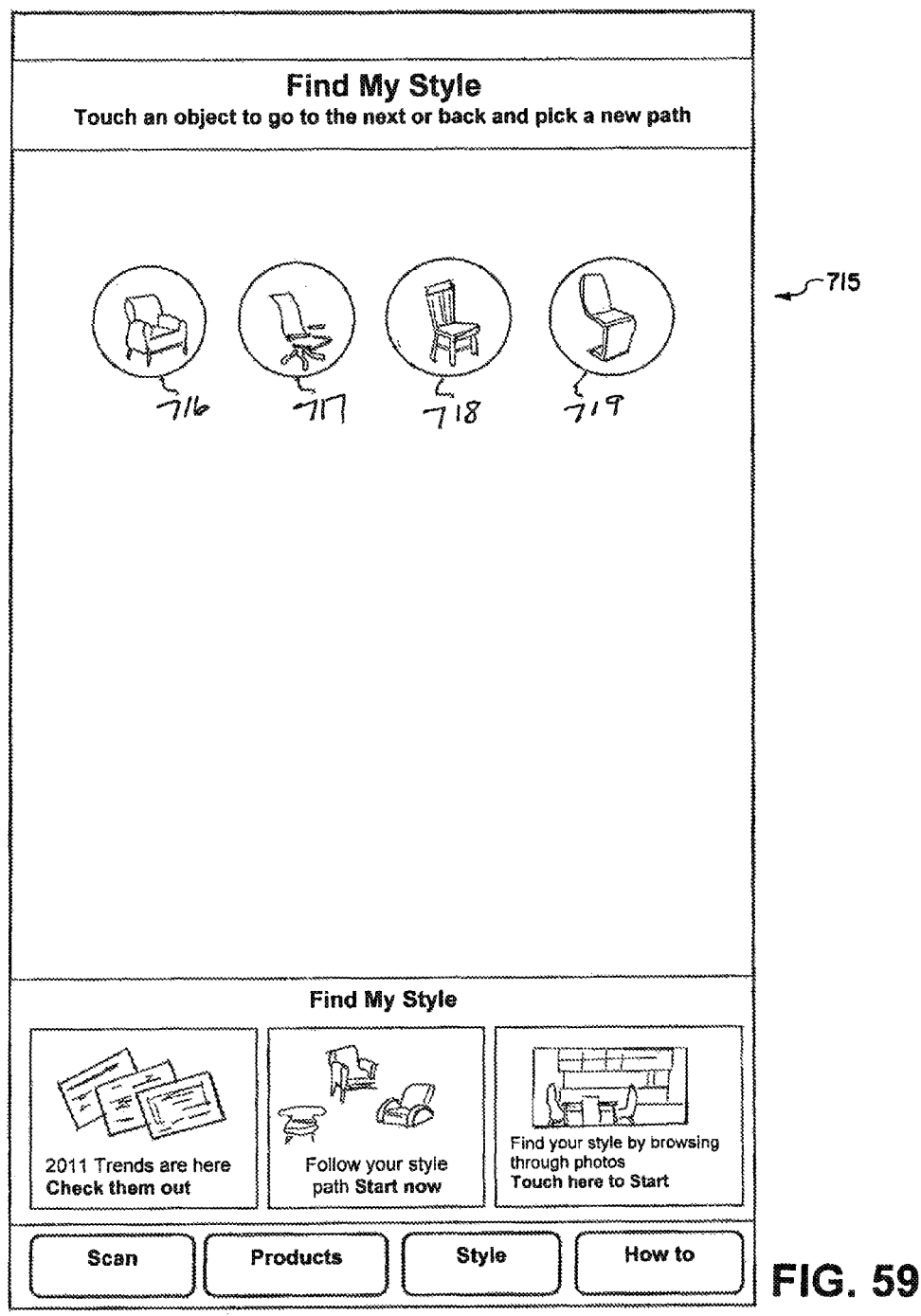
FIG. 59-62 illustrate respective "find my style" display screens of an illustrative Kiosk application.

FIG. 59 illustrates a "find my style" screen 715 which may be generated when the customer touch selected area 612 of FIG. 41, and which is the first selection for the Style Finder. This screen 715 enables the customer to touch-select an image that they prefer from images 716, 717, 718, 719, switch to the 2010 Color Trends guide, switch to the style guide, and switch to another interactive category by touching respective touch sensitive areas of the screen 715.

Figure 60:
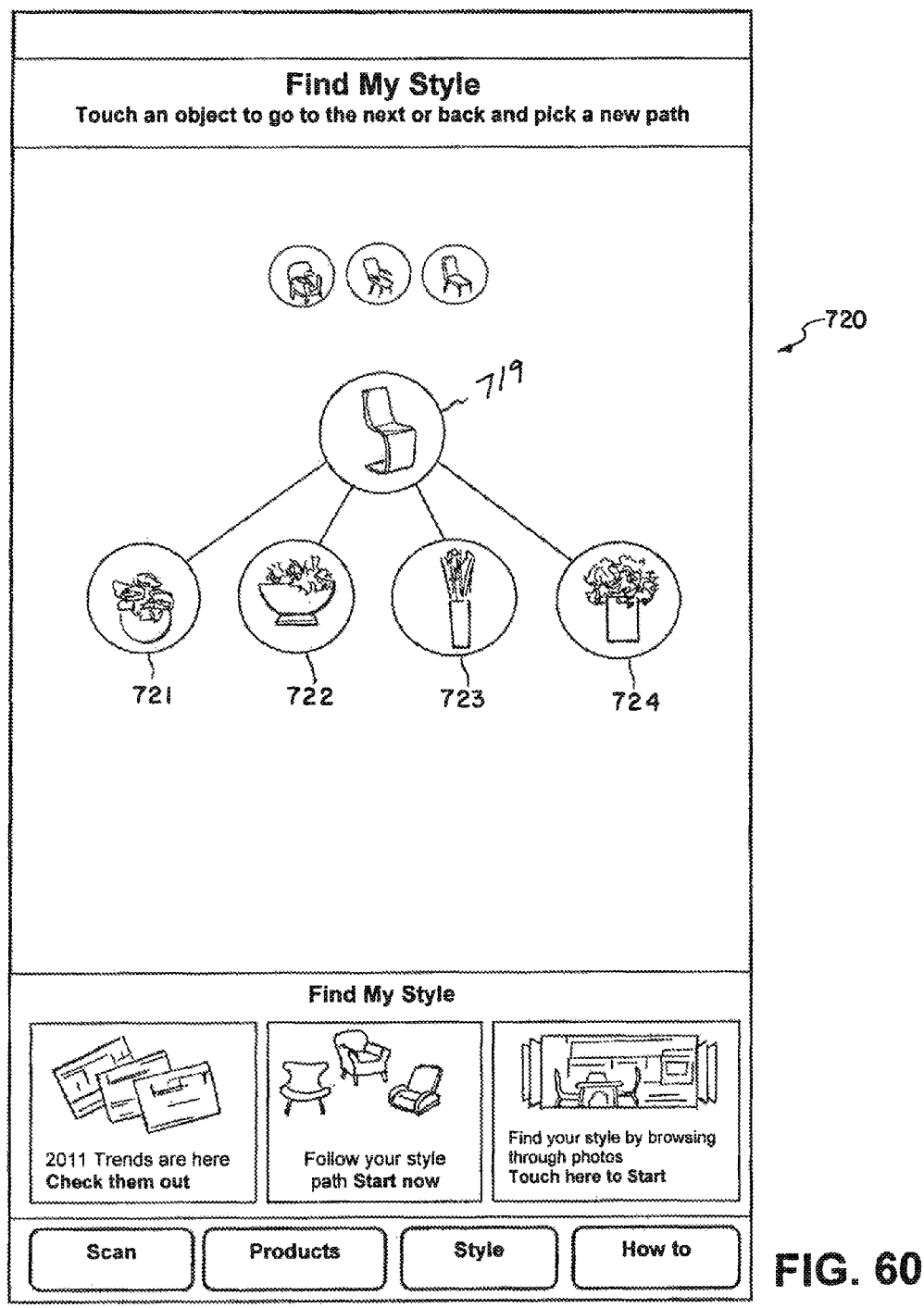

FIG. 60 illustrates a second "find my style" screen 720, which is the second selection for the Style Finder. This screen displays the image 719 selected in screen 715 and enables the customer to select another image that they prefer from images 721, 722, 723, or 724, switch to 2010 Color Trends guide, switch to the style guide, or switch to another interactive category, again by touching respective areas of the screen 720.

Figure 61:
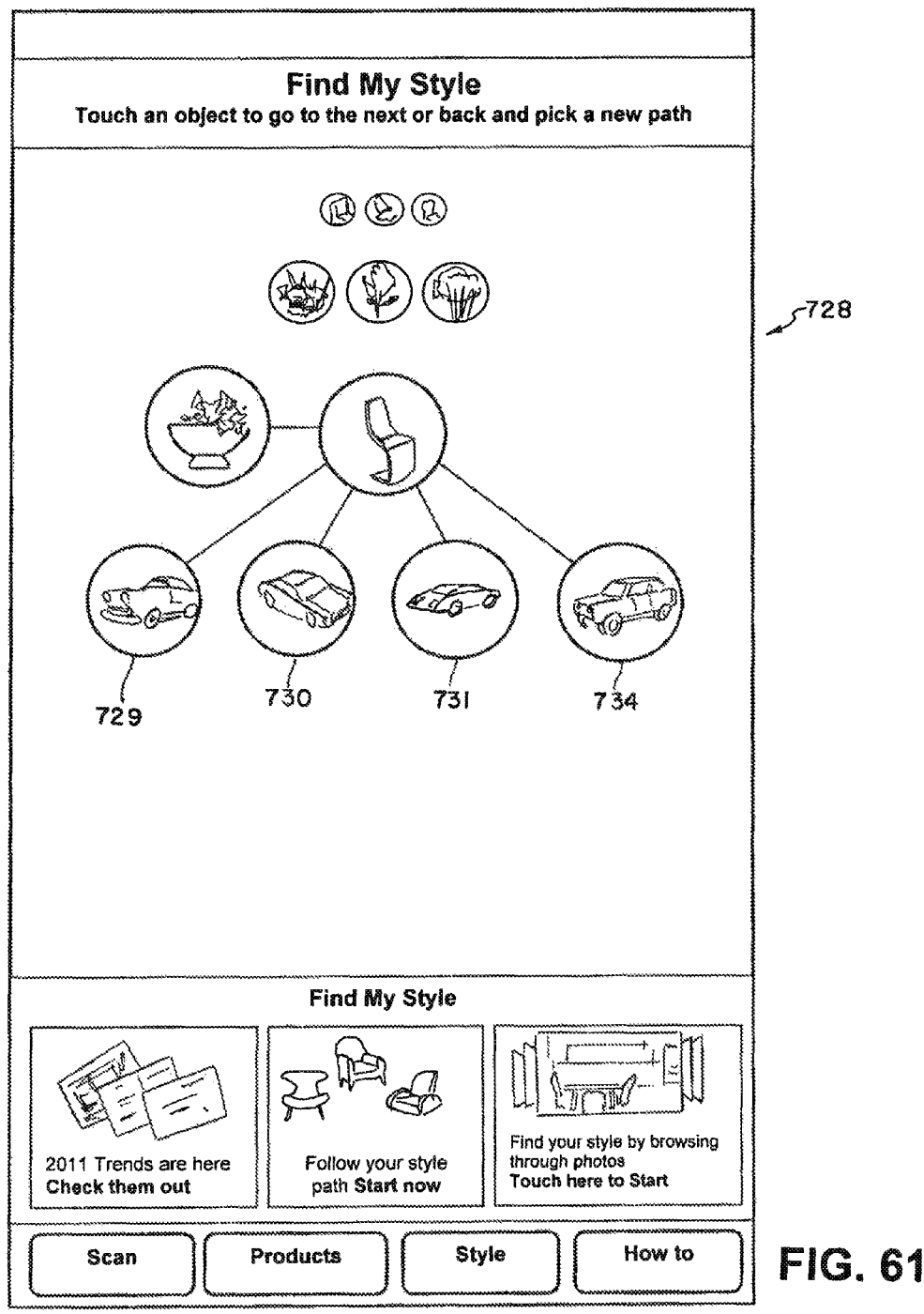

FIG. 61 illustrates a third "find my style" screen 728, which is the third selection for the Style Finder. This screen 728 enables the customer to select a third image that they prefer from images 729, 730, 731, or 734, switch to the 2010 Color Trends guide, switch to the style guide, or switch to another interactive category by appropriate touch selection.

Figure 62:
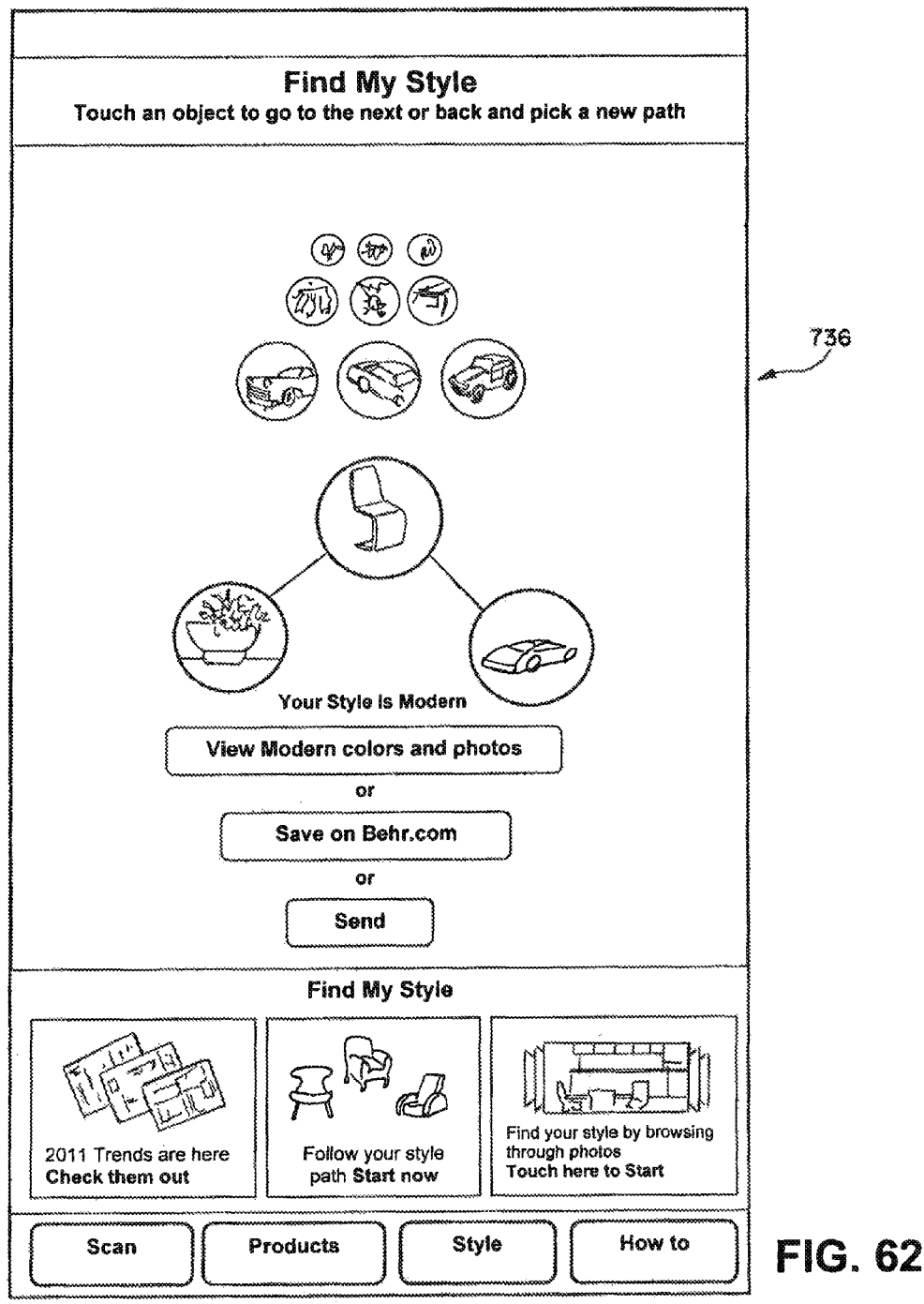

FIG. 62 illustrates a "find my style" results screen 736, which provides the style results for the style finder. This screen allows the customer to view the style that they have chosen, save the results to a website, send the result by text message or email, switch to the 2010 Color Trends guide, switch to the style guide, switch to another interactive category by appropriate touch selection.

Figure 63:
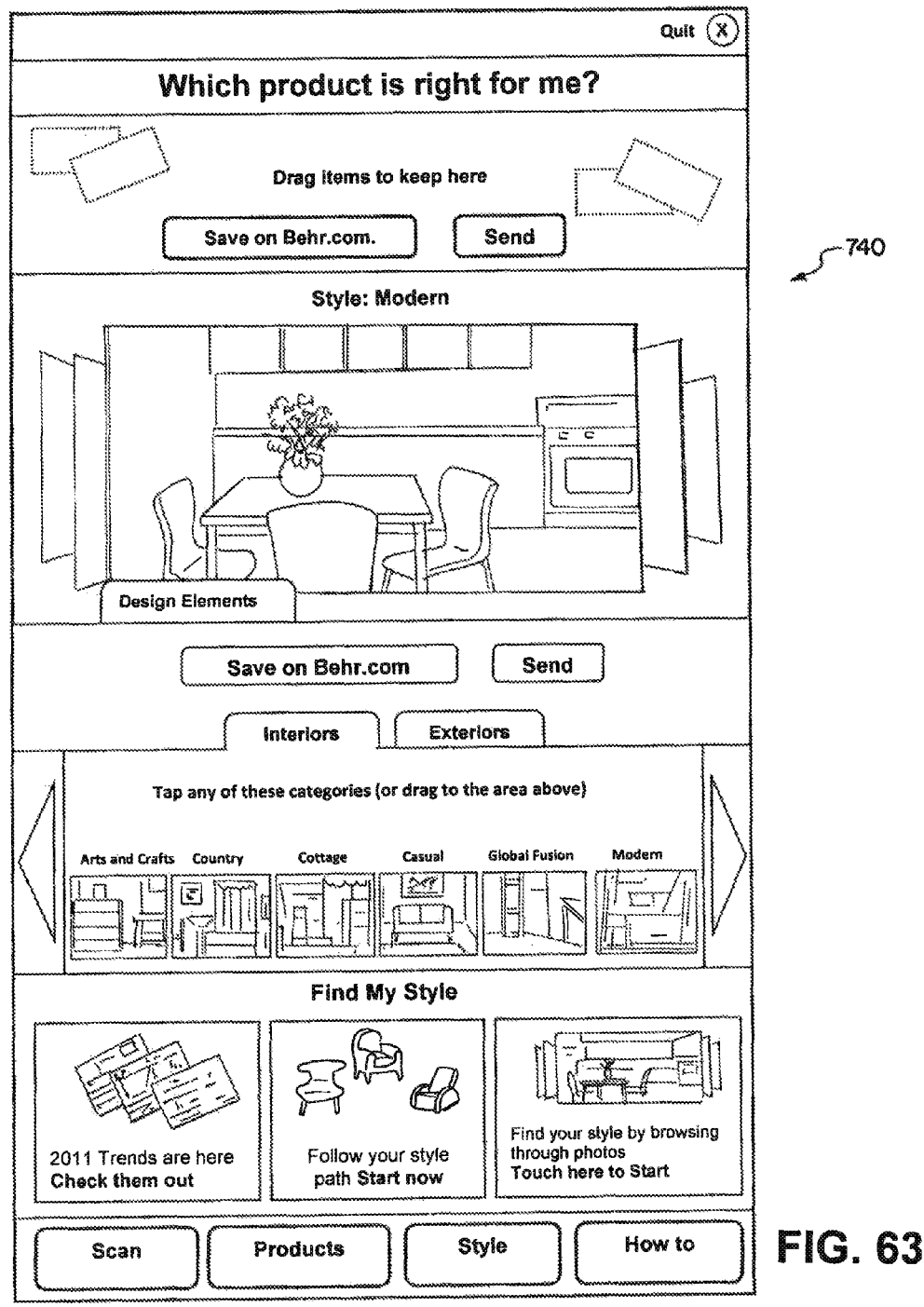
FIG. 63 illustrates a "modern style" display screen.

FIG. 63 illustrates a "modern style" screen 740, which allows the customer to view the style that they have chosen, and by appropriate touches, view different images that represent the selected style, view the associated design elements for the previewed image, drag favorite images to the top of the screen to save on a website or send by text message or email, save the results to a website, send the results by text message or email, view different style categories for the interior and the exterior, switch to the 2010 Color Trends guide, switch to the style guide, switch to the style finder, or switch to another interactive category.

The illustrative embodiment screens or web pages and functionality of FIGS. 29 to 63 may be implemented in an application program or application programs which may be written in, for example, Java, Laszlo Presentation Server or C++ and, which may run, for example, on a Windows XP or other operating system. The application may be based locally, such as in memory located in a kiosk or may be accessed over one or more communication links, such as from a server over the internet.

It will be further appreciated that the computer program applications described herein are stored on computer readable storage media which tangibly stores thereon computer readable instructions. For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD or other optical storage, magnetic cassettes, magnetic tape, magnetic disk storage or other magnetic storage devices, or any other physical or material medium, which can be used to tangibly store the desired information or data or instructions and which can be accessed by a computer or processor.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A display unit comprising:
a display structure comprising a computer controlled card reading video station and a display of a plurality of manually manipulable coded paint color sample cards, the display structure and video station being configured such that a consumer may access the video station and pass one of the coded paint color sample cards past a code reader which causes the consumer to thereafter be presented with a visual display of a color present on the coded paint sample card and access to a selectable sequence of video display screens selectable by the consumer in response to consumer interaction with said video station the selectable sequence of video display screens comprising part of a color selection application program configured to assist the consumer in selection of one or more paint colors.

2. The display unit of claim 1 wherein said card reading video station is located in a Kiosk and comprises a touch sensitive interactive display screen configured to enable a user to selectively access a plurality of color selection and/or message transmission features.

3. The display unit of claim 1 wherein one of the paint color sample cards comprises a color combo card having a main color, a trim color, an accent color and an inspirational graphic.

4. The display unit of claim 1 wherein said sequence of video screens comprises a first display screen displaying an image of a room and configured to enable a selected color to be applied to a selected area of the room image through a plurality of touch-select operations performed with respect to said first display screen.

5. The display unit of claim 4 wherein said sequence of video screens comprises a second display screen depicting a plurality of color families and enabling a user to select another color to replace a previously displayed color.

6. The display unit of claim 5 wherein said sequence of video screens further comprises a plurality of display screens enabling a project summary to be sent by email or by text message respectively to one of a designated address or a designated phone number.

7. Apparatus comprising:
an array of manually manipulable coded paint sample cards; and
at least one computer controlled card reading video station located in said array of coded paint sample cards and configured such that a consumer may access the video station and pass a selected one of the coded paint sample cards past a code reader and thereafter be presented with a visual display of a color present on the selected sample card followed by a sequence of video display screens selectable by the consumer in response to consumer interaction with said video station, the selectable sequence of video display screens comprising part of an application program configured to enable a consumer to select one or more paint colors.

8. The apparatus of claim 7 wherein said video station comprises a touch sensitive interactive display screen configured to enable a user to selectively access a plurality of color selection and/or message transmission features.

9. The apparatus of claim 7 wherein one of said coded paint sample cards comprises a color combo card having a main color, a trim color, an accent color and an inspirational graphic.

10. The apparatus of claim 7 wherein said sequence of video screens comprises a first display screen displaying an image of a room and configured to enable a selected color to be applied to a selected area of the room image through a plurality of touch-select operations performed with respect to said first display screen.

11. The apparatus of claim 10 wherein said sequence of video display screens comprises a second display screen depicting a plurality of color families and configured to enable a user to select another color to replace a color previously displayed on said first display screen.

12. The apparatus of claim 11 wherein said sequence of video screens further comprises a plurality of display screens configured to enable a project summary to be sent by email or by text message respectively to a designated address or phone number.

13. Display apparatus comprising:
a display comprising an array of manually manipulable coded paint sample cards;
an interactive card reading video station positioned in said display, the video station being configured to read a code present on one of said coded paint sample cards
and to cause display on said visual display of a color present on a said coded paint sample card.

14. The apparatus of claim 13 further comprising an application program configured to provide a selectable sequence of display screens and wherein said sequence comprises a first display screen displaying an image of a room and configured to enable a selected color to be applied to a selected area of the room image through a plurality of touch-select operations performed with respect to said first display screen.

15. The display apparatus of claim 14 wherein each said display screen comprises a touch sensitive interactive display screen.

16. The display apparatus of claim 15 wherein said display screens further comprise a third display screen depicting a plurality of color families and configured to enable a user to select another color to replace a color previously displayed on said first display screen.

17. The display apparatus of claim 16 further comprising a plurality of display screens configured to enable a project summary to be sent by email or by text message respectively to a designated address or phone number.

18. A method comprising:
disposing at least one computer controlled card reading video station in a display structure configured to display a plurality of manually manipulable coded paint color sample cards;
configuring the video station such that a consumer may access the video station, select one of the coded paint sample cards, pass the selected coded paint color sample card past a code reader, and thereafter be presented with a visual display of a color present on the coded paint sample card; and subsequently presenting the consumer with a selectable sequence of video display screens selectable in response to consumer interaction with said video station, said display screens comprising part of an application program configured to assist the consumer in the selection of one or more paint colors not specified on the coded paint color sample card.

19. The method of claim 18 wherein said computer controlled card reading video station is located in a Kiosk and comprises a touch sensitive interactive display screen configured to enable a user to selectively access a plurality of color selection and/or message transmission features.

20. The method of claim 18 wherein one of the said coded paint sample cards comprises a color combo card having a main color, a trim color, an accent color and an inspirational graphic.

21. The method of claim 18 wherein said sequence of video screens comprises a first display screen displaying an image of a room and configured to enable a selected color to be applied to a selected area of the room image through a plurality of touch-select operations performed with respect to said first display screen.

22. The method of claim 21 wherein said sequence of video screens comprises a second display screen depicting a plurality of color families and enabling a user to select another color to replace a previously displayed color.

23. The method of claim 22 wherein said sequence of video screens further comprises a plurality of display screens enabling a project summary to be sent by email or by text message respectively to one of a designated address or a designated phone number.

* * * * *